(12) United States Patent
Inoue

(10) Patent No.: US 7,707,370 B2
(45) Date of Patent: Apr. 27, 2010

(54) INFORMATION PROCESSING APPARATUS, INFORMATION PROCESSING METHOD, AND PROGRAM

(75) Inventor: Norihiko Inoue, Yamanashi (JP)

(73) Assignee: NEC Corporation, Tokyo (JP)

( * ) Notice: Subject to any disclaimer, the term of this patent is extended or adjusted under 35 U.S.C. 154(b) by 702 days.

(21) Appl. No.: 11/613,310

(22) Filed: Dec. 20, 2006

(65) Prior Publication Data

US 2007/0150674 A1 Jun. 28, 2007

(30) Foreign Application Priority Data

Dec. 22, 2005 (JP) ............................. 2005-370606

(51) Int. Cl.
*G06F 12/00* (2006.01)
(52) U.S. Cl. ........................................ 711/157
(58) Field of Classification Search ...................... None
See application file for complete search history.

(56) References Cited

U.S. PATENT DOCUMENTS

| 5,341,486 A * | 8/1994 | Castle ......................... 711/5 |
| 6,170,039 B1 * | 1/2001 | Kishida ...................... 711/127 |
| 6,233,662 B1 * | 5/2001 | Prince, Jr. .................. 711/157 |

FOREIGN PATENT DOCUMENTS

JP  10-301842 A  11/1998

\* cited by examiner

*Primary Examiner*—Hiep T Nguyen
(74) *Attorney, Agent, or Firm*—Dickstein Shapiro LLP

(57) ABSTRACT

An information processing device is provided with a plurality of memory channels, and performs interleave control on a unit memory connected to a memory channel. Furthermore, the information processing device has a circuit for performing the interleave control such that an interleave number on access to the unit memory connected to the memory channel can be constantly a multiplier of 2.

7 Claims, 21 Drawing Sheets

|  | MEMORY CHANNEL | ACCESS ADDRESS |
|---|---|---|
| 1 WAY AREA | IDENTIFIED BY HIT SIGNAL | A9~A3 |
| 2 WAY AREA | IDENTIFIED BY A3 | A10~A4 |
| 4 WAY AREA | IDENTIFIED BY A4~A3 | A11~A5 |
| 8 WAY AREA | IDENTIFIED BY A5~A3 | A12~A6 |

FIG. 5

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program, and more specifically to an information processing apparatus, an information processing method, and a program for performing interleave independent of a memory configuration.

2. Description of Related Art

To realize an interleave number that is constantly a multiplier of 2 in the interleave control of a storage device, there has been the restriction of expanding or degenerating memory subordinate to a memory channel in a memory number unit satisfying the condition that the interleave number is a multiplier of 2.

When the interleave number (3, 5, 6, 7 ~) other than a multiplier of 2 is realized by hardware, it is necessary to add a complicated address conversion circuit.

A conventional technology described in Japanese Patent Laid-Open No. 10-301842 sets different interleave groups, and interleaves memory in a sub-bank unit constituting a bank.

The problem of the technology described in Japanese Patent Laid-Open No. 10-301842 is that the interleave cannot be performed depending on the number of sub-banks in the bank.

The reason is that if there is the sub-bank of the interleave group #1 in the bank % 4 shown in FIG. 5, the interleave group #1 is 5 WAYs. The technology of Japanese Patent Laid-Open No. 10-301842 does not indicate the solution to this case.

SUMMARY OF THE INVENTION

The advantage of the present invention is to provide an information processing apparatus, an information processing method, and a program for performing interleave independent of a memory configuration implemented under memory channels (bank) by setting the interleave number of the access to all memory as a multiplier of 2.

A first information processing device according to the present invention includes a unit memory connected to a plurality of memory channels, and a circuit for performing interleave control such that an interleave number can be constantly a multiplier of 2 when the unit memory connected to the memory channels is accessed.

A second information processing apparatus according to the present invention is based on the first information processing apparatus, and further includes a circuit for interleaving by a WAY number $Z1$ the unit memory of the WAY number $Z1$ as a maximum multiplier of 2 not exceeding a maximum WAY number $X$ as a multiplier of 2 when a total number of the unit memory is $Y$, interleaving by a WAY number $Z2$ the unit memory of the WAY number $Z2$ as a maximum multiplier of 2 not exceeding the maximum WAY number $X$ in unit memory of $Y-Z1$, ..., and interleaving, by a WAY number $Zi$, the remaining unit memory of the WAY number $Zi$ as a maximum multiplier of 2 not exceeding the maximum WAY number $X$.

A third information processing apparatus according to the present invention is based on the second information processing apparatus, and further includes: a segment information holding circuit for holding segment information as a pair of any of the WAY number $Z1$, $Z2$, ..., and $Zi$, and a number of lower limit address increment segments as an increment from an address of the unit memory for which interleave is determined in advance in the same memory channel; a lower limit address circuit for holding a lower limit address obtained by adding an upper limit address of the unit memory for which interleave is determined in advance in the same memory channel to the number of the lower limit address increment segments of the unit memory of the segment information; an upper limit address circuit for holding an upper limit address obtained by adding the lower limit address of the unit memory to a WAY number of the unit memory of the segment information; and an address conversion circuit for outputting a hit signal when "the lower limit address $\leq$ an access address < the upper limit address" holds true, and performing interleave of a WAY number of a number of hit signals on the access address.

A fourth information processing apparatus according to the present invention is based on the third information processing apparatus, and includes: a data processing device having the segment information holding circuit and outputting an access address; and a memory controller for inputting an access address and including the lower limit address circuit, the upper limit address circuit, and the address conversion circuit.

A fifth information processing apparatus according to the present invention is based on the fourth information processing apparatus, and includes a memory device connected to the memory controller and provided with the unit memory.

A sixth information processing apparatus according to the present invention is based on the third information processing apparatus, and includes: an data processing device for outputting an access address; and a memory controller having the lower limit address circuit, the upper limit address circuit, and the address conversion circuit.

A seventh information processing apparatus according to the present invention is based on the sixth information processing apparatus, and includes a memory device connected to the memory controller and provided with the unit memory.

A first information processing method according to the present invention performs interleave control on a unit memory connected to a plurality of memory channels such that an interleave number can be constantly a multiplier of 2 when the unit memory connected to the memory channels is accessed.

A second information processing method according to the present invention is based on the first information processing method, interleaves by a WAY number $Z1$ the unit memory of the WAY number $Z1$ as a maximum multiplier of 2 not exceeding a maximum WAY number $X$ as a multiplier of 2 when a total number of the unit memory is $Y$, interleaves by a WAY number $Z2$ the unit memory of the WAY number $Z2$ as a maximum multiplier of 2 not exceeding the maximum WAY number $X$ in unit memory of $Y-Z1$, ..., and interleaves, by a WAY number $Zi$, the remaining unit memory of the WAY number $Zi$ as a maximum multiplier of 2 not exceeding the maximum WAY number $X$.

A third information processing method according to the present invention is based on the second information processing method, holds segment information as a pair of any of the WAY number $Z1$, $Z2$, ..., and $Zi$, and a number of lower limit address increment segments as an increment from an address of the unit memory for which interleave is determined in advance in the same memory channel, holds a lower limit address obtained by adding an upper limit address of the unit memory for which interleave is determined in advance in the same memory channel to the number of the lower limit address increment segments of the unit memory of the segment information, holds an upper limit address obtained by adding the lower limit address of the unit memory to a WAY number of the unit memory of the segment information; outputs a hit signal when "the lower limit address≦an access address<the upper limit address" holds true, and performs interleave of a WAY number of a number of hit signals on the access address.

A first program according to the present invention in a computer readable medium by which a computer included in an information processing apparatus operates to cause the information processing apparatus to perform a process includes performing interleave control on a unit memory connected to a plurality of memory channels such that an interleave number can be constantly a multiplier of 2 when the unit memory connected to the memory channels is accessed.

A second program according to the present invention is based on the first program, the process further includes interleaving by a WAY number $Z1$ the unit memory of the WAY number $Z1$ as a maximum multiplier of 2 not exceeding a maximum WAY number X as a multiplier of 2 when a total number of the unit memory is Y, interleaving by a WAY number $Z2$ the unit memory of the WAY number $Z2$ as a maximum multiplier of 2 not exceeding the maximum WAY number X in unit memory of Y−Z1, ..., and interleaving, by a WAY number $Z_i$, the remaining unit memory of the WAY number $Z_i$ as a maximum multiplier of 2 not exceeding the maximum WAY number X.

The effect of the present invention is to easily realize access to all memory independent of a memory configuration implemented under memory channels.

The reason is that interleave control can be performed such that the interleave number can be constantly a multiplier of 2 when unit memory connected to memory channels is accessed.

BRIEF DESCRIPTION OF THE DRAWINGS

This above-mentioned and other objects, features and advantages of this invention will become more apparent by reference to the following detailed description of the invention taken in conjunction with the accompanying drawings, wherein:

FIG. 5 is an explanatory view showing the operation of the address conversion circuit;

DETAILED DESCRIPTION OF THE EXEMPLARY EMBODIMENTS

Figure 1A:
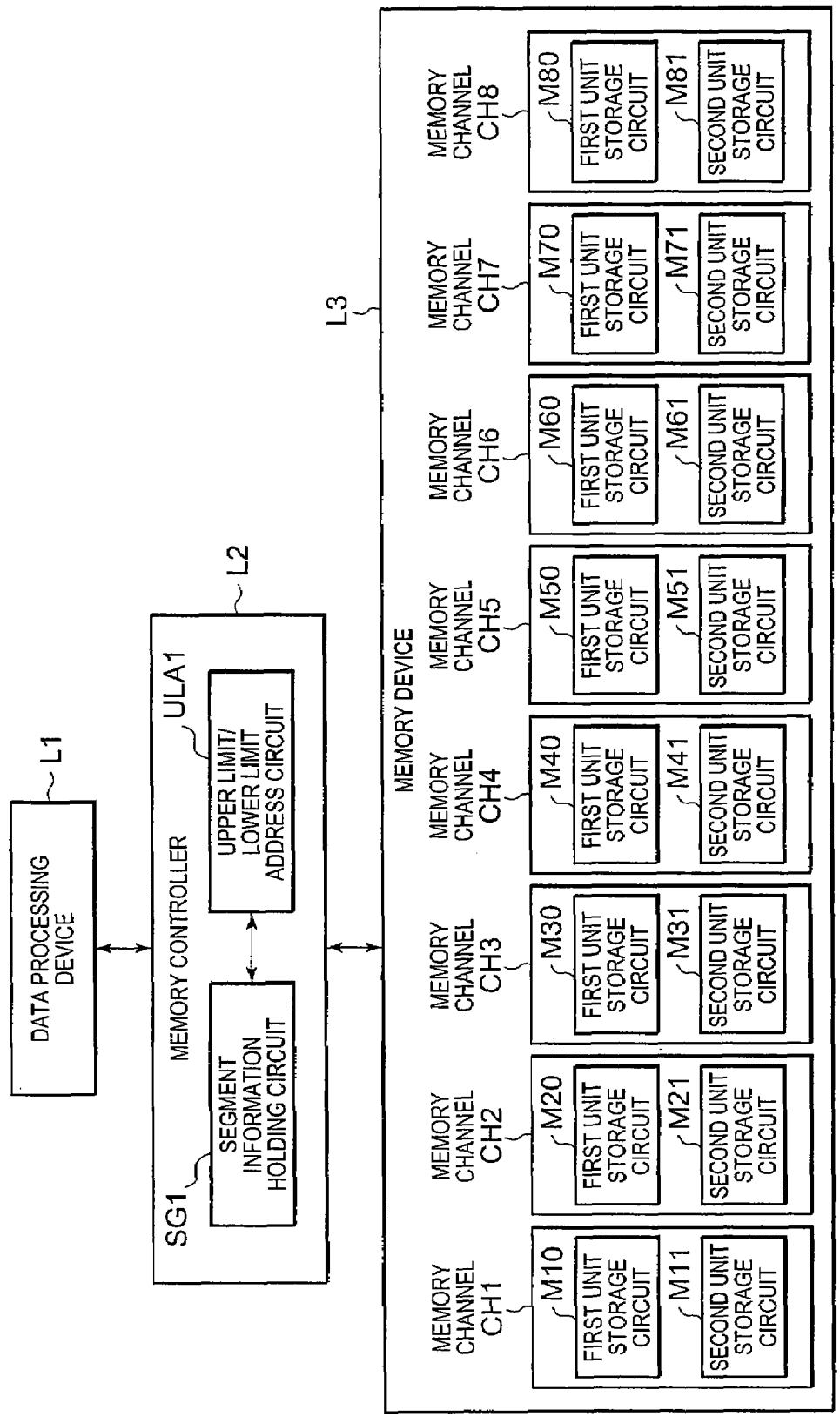
FIGS. 1A and 1B are a block diagram showing the configuration of the best mode for embodying the present invention.

FIG. 1 is a block diagram showing the configuration of the best mode for embodying the present invention.

In FIG. 1, an information processing apparatus according to the present invention includes a data processing device L1 (for example, a CPU, etc.), a memory controller L2, and a memory device L3. The memory device L3 includes memory channels CH1 to CH8. Each of the memory channels CH1 to CH8 includes a first unit storage circuit M10 and a second unit storage circuit M11 to a first unit storage circuit M70 and a second unit storage circuit M71, and a first unit storage circuit M80 (for example, memory).

The total number Y of unit storage circuits does not exceed the maximum WAY number X (8 in this example) as a multiplier of 2×2. The total number Y is not limited to the number shown in FIG. 1. The maximum WAY number X is set in advance.

The maximum WAY number $Z1$ (8 in this example) as a multiplier of 2 not exceeding X is defined, and unit storage circuits are assigned as the first unit storage circuits M10 to M80 sequentially to the memory channels CH1 to CH8, respectively. The remaining unit storage circuits are assigned as the second unit storage circuits M11 to M71 to the memory channels CH1 to CH7.

The first unit storage circuits M10 to M80 are interleaved by the WAY number $Z1$ (=8). Since there are the remaining unit storage circuits, the four second unit storage circuits M11 to M41 in the remaining <<Y(=15)−Z1(=8)>>=7 circuits are interleaved by the maximum WAY number $Z2$ (=4) as the multiplier of 2 not exceeding X, ..., the remaining unit storage circuits are sequentially interleaved by a multiplier of 2 at Zi (final). The first unit storage circuits M10 to M80 are unit storage circuits <<for which interleave is determined in advance>> for the second unit storage circuits M11 to M41.

For each of the first unit storage circuit M10 to a second unit storage circuit M81 (the first unit storage circuit M80 and the second unit storage circuit M81 are dummy circuits) of the memory channels CH1 to CH8, a segment information holding circuit SG1 storing the segment information including a pair of any of the WAY number $Z1$, $Z2$, ... and a number of lower limit address increment segments is held for each memory channel in the data processing device L1 or the memory controller L2.

The number of lower limit address increment segments is an increment from the first unit storage circuits M10 to M80 for the second unit storage circuits M11 to M81. For example, when the WAY numbers Z1, Z2, Z3, and Z4 are assigned, and when the first unit storage circuit of a memory channel is interleaved with the WAY number Z1 and the second unit storage circuit is interleaved with the WAY number Z2, it is effective to set the "total value of the number of interleave for which the interleaving process has been determined in advance×unit memory capacity" as a number of lower limit address increment segments for the second unit storage circuit.

To be exact, it is effective to set the number of lower limit address increment segments for the n-th unit memory of a memory channel CHk, when the interleave is performed in advance in the same memory channel CHk and the same n-th unit memory, to hold in the remaining memory channel CHk the number of incremented segments of the n-th unit memory="total number of WAY numbers interleaved in advance in the same n-th unit memory"×unit memory capacity.

For example, when X=8, and there are 15 unit storage circuits, the memory channel is set to "the second power of 2=4", eight unit storage circuits are first assigned as the first unit storage circuits to the memory channels CH1 to CH8. Then, the remaining 15−8=7 unit storage circuits are assigned as the second unit storage circuits to the first to seventh memory. Then, the first unit storage circuits of the memory channels CH1 to CH8 are interleaved by 8 WAYs. Next, the second unit storage circuits of the memory channels CH1 to CH4 are interleaved by 4 WAYs. Then, the second unit storage circuits of the memory channels CH5 and CH6 are interleaved by 2 WAYs. The second unit storage circuit of the memory channel CH7 is 1 WAY.

The segment information about the memory channels CH1 to CH4 is "the WAY number=8, and the number of lower limit address increment segments=0" of the first unit storage circuits M10 to M40, and "the WAY number=4, the number of lower limit address increment segments=0" of the second unit storage circuits M11 to M41. The segment information about the memory channels CH5 and CH6 is "the WAY number=8 and the number of lower limit address increment segments=0" of the first unit storage circuits M50 to M60, and "the WAY number=2, and the number of lower limit address increment segments=4" of the second unit storage circuits M51 to M61. The number of lower limit address increment segments=4 refers to "the total value of the number of interleave for which the interleaving process has been determined in advance×unit memory capacity"=4. The segment information about the memory channel CH7 is "the WAY number=8, and the number of lower limit address increment segments=0" of the first unit storage circuit M70, and "the WAY number=1, and the number of lower limit address increment segments=6" of the second unit storage circuit M71. The number of lower limit address increment segments 6 is "the total value of the number of interleave for which the interleaving process has been determined in advance×unit memory capacity"=4+2=6. The segment information about the memory channel CH8 is "the WAY number=8, and the number of lower limit address increment segments=0" of the first unit storage circuit M80, and "the WAY number=0, and the number of lower limit address increment segments=0" of the second unit storage circuit M81.

The following definitions are made according to the segment information.

lower limit address of first unit storage circuit=number of lower limit address increment segments of first unit storage circuit upper limit address of first unit storage circuit=lower limit address of first unit storage circuit+WAY number of first unit storage circuit lower limit address of second unit storage circuit=upper limit address of first unit storage circuit+number of lower limit address increment segments of second unit storage circuit upper limit address of second unit storage circuit=lower limit address of second unit storage circuit+WAY number of second unit storage circuit. In the definitions, a base address can be added to the lower limit address of the first unit storage circuit.

For a predetermined portion A (portion no more than the number of bits representing the maximum WAY number×2) of a memory address at which memory is accessed, the lower limit address of the first unit storage circuit≦A<upper limit address of the first unit storage circuit, and the lower limit address of the second unit storage circuit≦A<upper limit address of the second unit storage circuit are calculated. When one of the calculation results holds, it is defined that a hit is found. A hit is checked for all memory channels. When there is one hit, 1 WAY is considered. When two hits are found, 2 WAYs are considered. When there are four hits, 4 WAYs are considered. When there are eight hits, 8 WAYs are considered, and so on. Next, a memory channel is selected on the basis of another predetermined portion B of the memory address, and the memory is accessed.

Figure 1B:
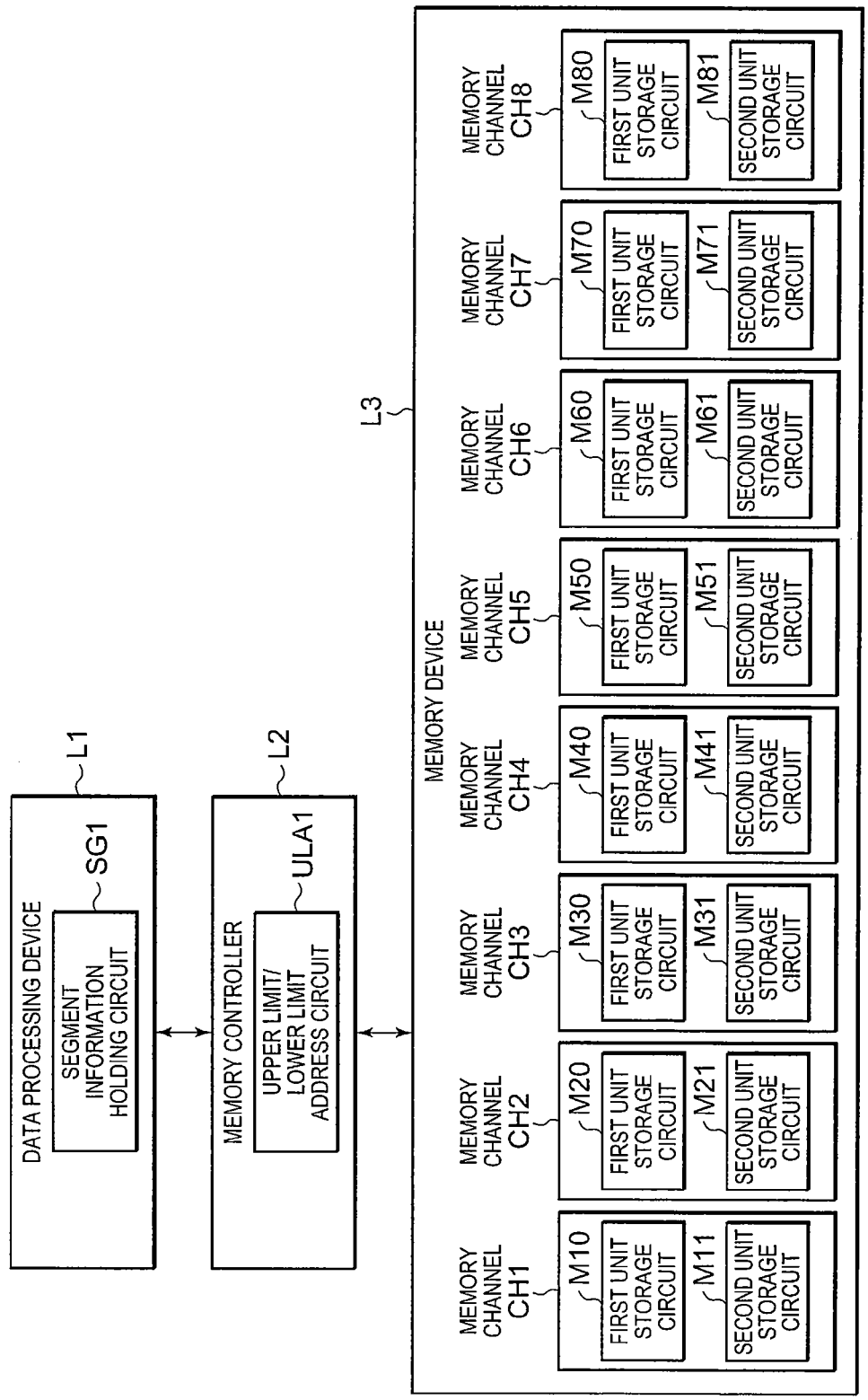

It is possible to provide the segment information holding circuit SG1 for storing segment information, and an upper limit/lower limit address circuit ULA1 for holding the lower limit address of the first unit storage circuit, the upper limit address of the first unit storage circuit, the lower limit address of the second unit storage circuit, and the upper limit address of the second unit storage circuit (FIG. 1A) It is also possible to provide the segment information holding circuit SG1 in the data processing device L1, and the upper limit/lower limit address circuit ULA1 in the memory controller L2 (FIG. 1B). In this case, the data processing device L1 performs a calculation, and sets a value in the upper limit/lower limit address circuit ULA1 in the memory controller L2.

Described above is the case in which the total number Y of unit storage circuits does not exceed the maximum WAY number X×2 as a multiplier of 2, the present invention can also be applied when it is larger than the maximum WAY number X×2 as a multiplier of 2. In this case, the quotient (integer) of Y/X of unit storage circuits are interleaved by the maximum WAY number X. The remaining number Y−quotient (integer) of Y/X of unit storage circuits are configured by the n-th unit storage circuit, and the (n+1)th unit storage circuit, etc. The n-th unit storage circuit and the (n+1)th unit storage circuit are interleaved with the circuits respectively regarded as the above-mentioned first unit storage circuit and the second unit storage circuit.

The first effect of the present invention is to realize the access to all memory by the interleave number as multiplier of 2 independent of the memory configuration implemented under the memory channels, and to provide a simple and high-speed memory controller L2.

The second effect of the present invention is to eliminate the restrictions on the number of memories when the memory implemented under the memory controller L2 is expanded and degenerated. That is, the memory can be expanded by any number of units, and the memory can be degenerated in the minimum memory unit.

The reason is that there is a circuit for holding the address space information allocated to each memories under the memory channel, that is, the information about the lower limit address and the upper limit address, and the address space can be arbitrarily and variably set.

The embodiments of the present invention are explained below in detail by referring to the attached drawings.

The first unit storage circuit and the second unit storage circuit are hereinafter referred to simply as unit memory.

Figure 2:
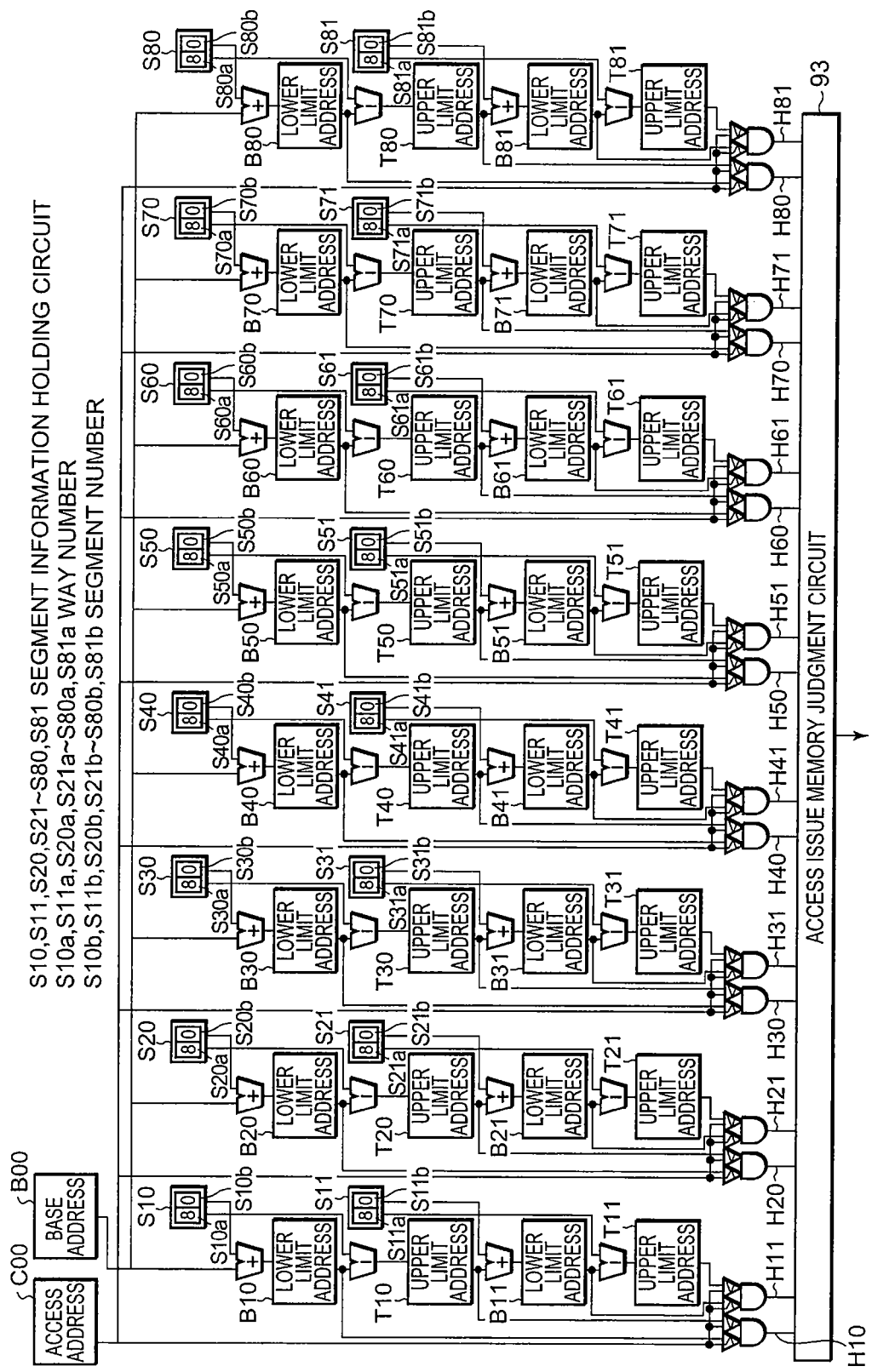
FIG. 2 is a block diagram showing the configurations of address conversion circuits according to the present invention.
Figure 3:
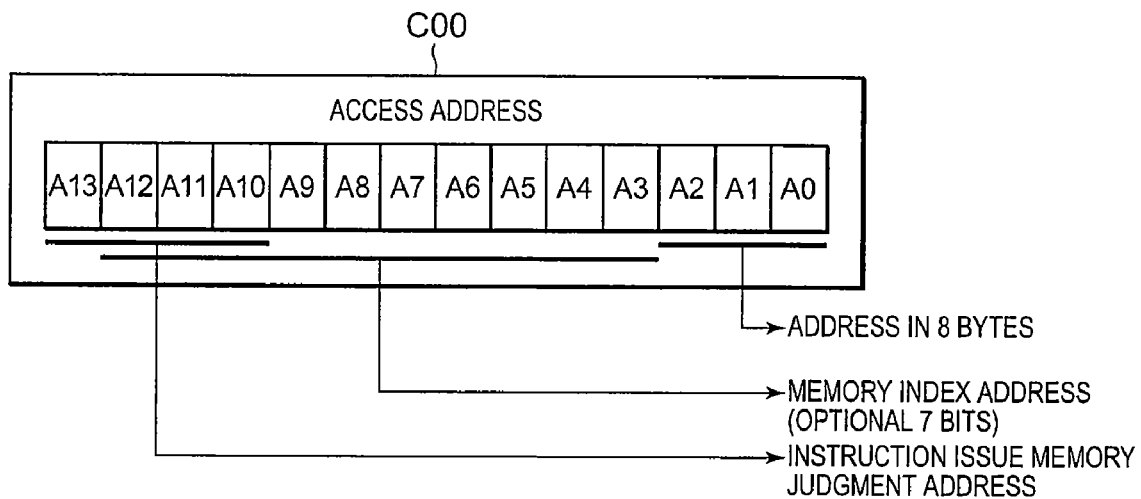
FIG. 3 is an explanatory view showing the operation of the address conversion circuit.
Figure 4:
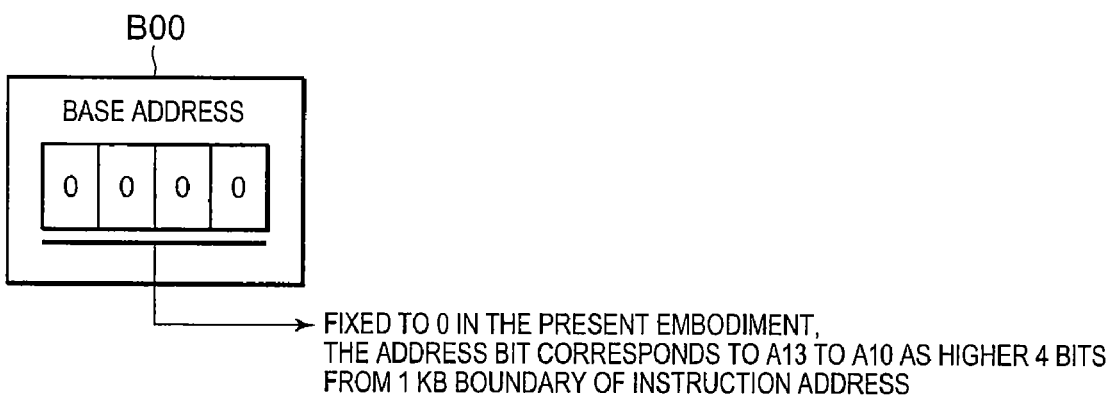
FIG. 4 is an explanatory view showing the operation of the address conversion circuit.

FIG. 2 is a block diagram showing the configurations of address conversion circuits of memory controllers according to first, second, third, and fourth embodiments of the present invention. FIGS. 3, 4, and 5 are explanatory views showing the operation of the address conversion circuits shown in FIG. 2.

Figure 6:
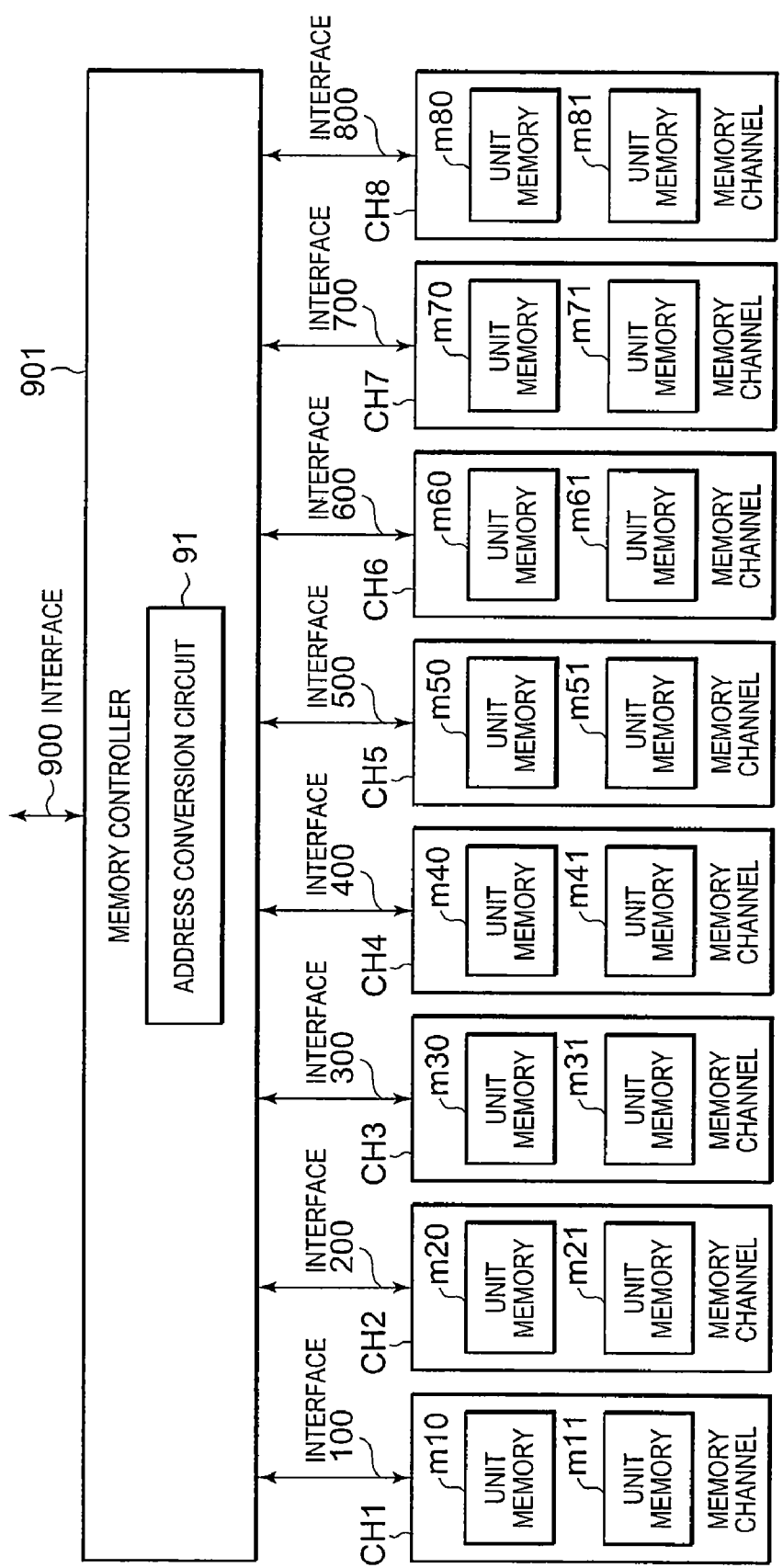
FIG. 6 is a block diagram showing the configuration of a first embodiment of the present invention.
Figure 7:
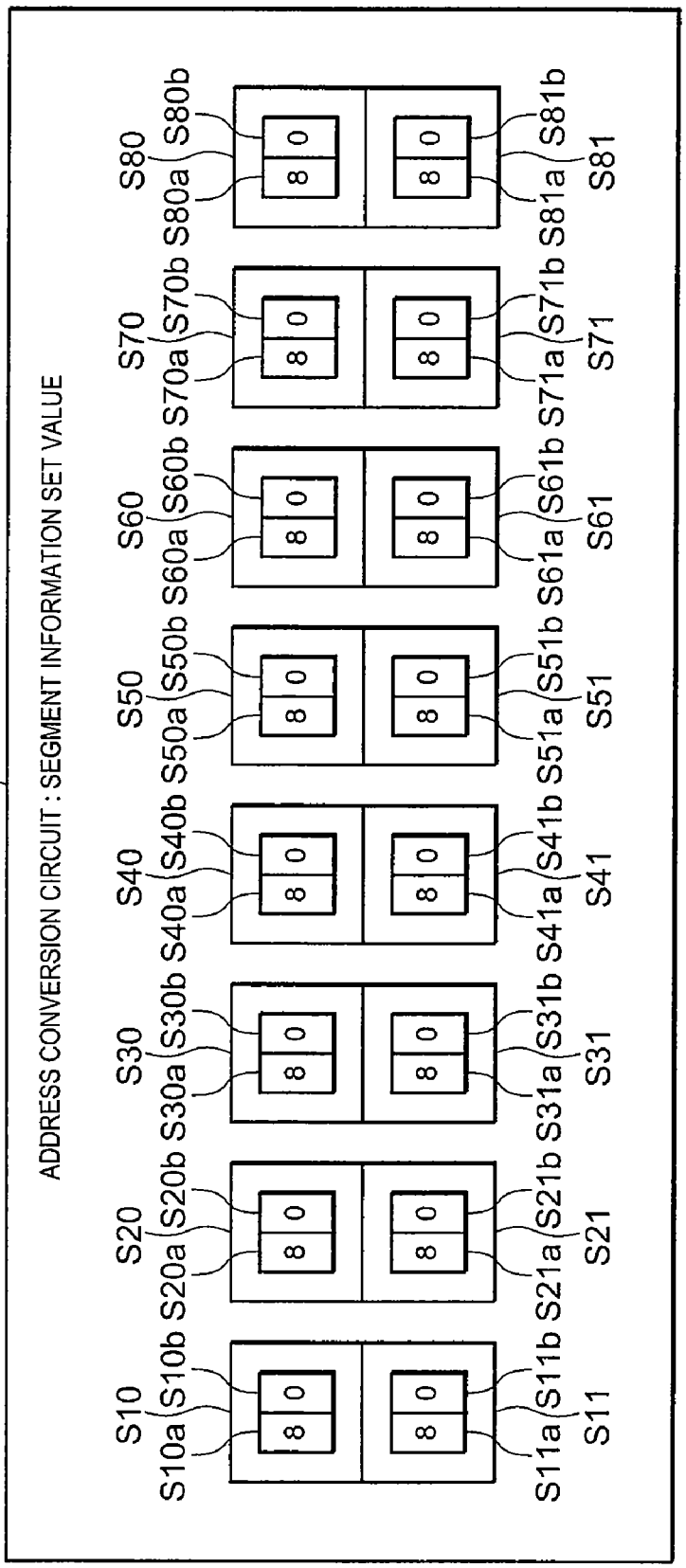
FIG. 7 is an explanatory view showing the operation of the first embodiment of the present invention.
Figure 8:
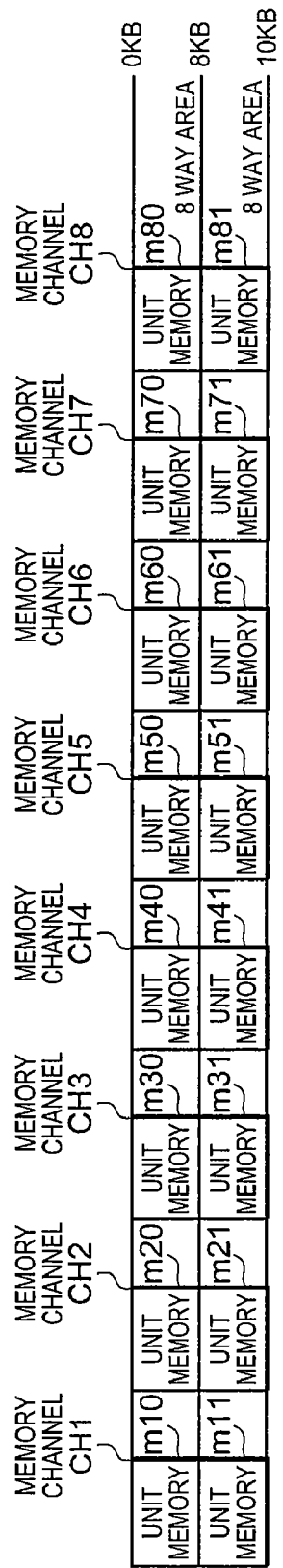
FIG. 8 is an explanatory view showing the operation of the first embodiment of the present invention.
Figure 9:
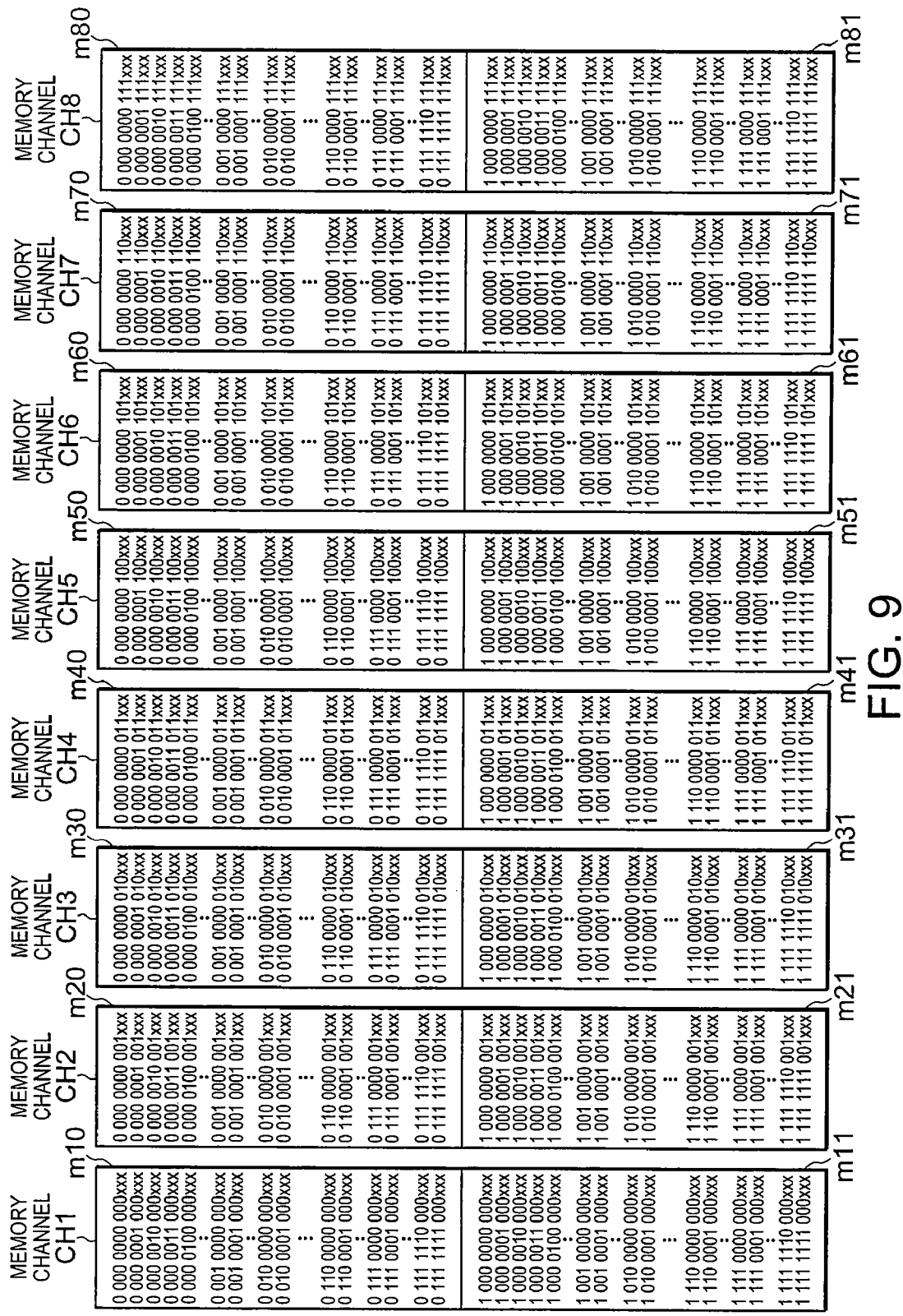
FIG. 9 is an explanatory view showing the operation of the first embodiment of the present invention.

FIG. 6 is a block diagram showing the configuration of the first embodiment of the present invention. FIGS. 7, 8, and 9 are explanatory views showing the operation according to the first embodiment of the present invention.

Figure 10:
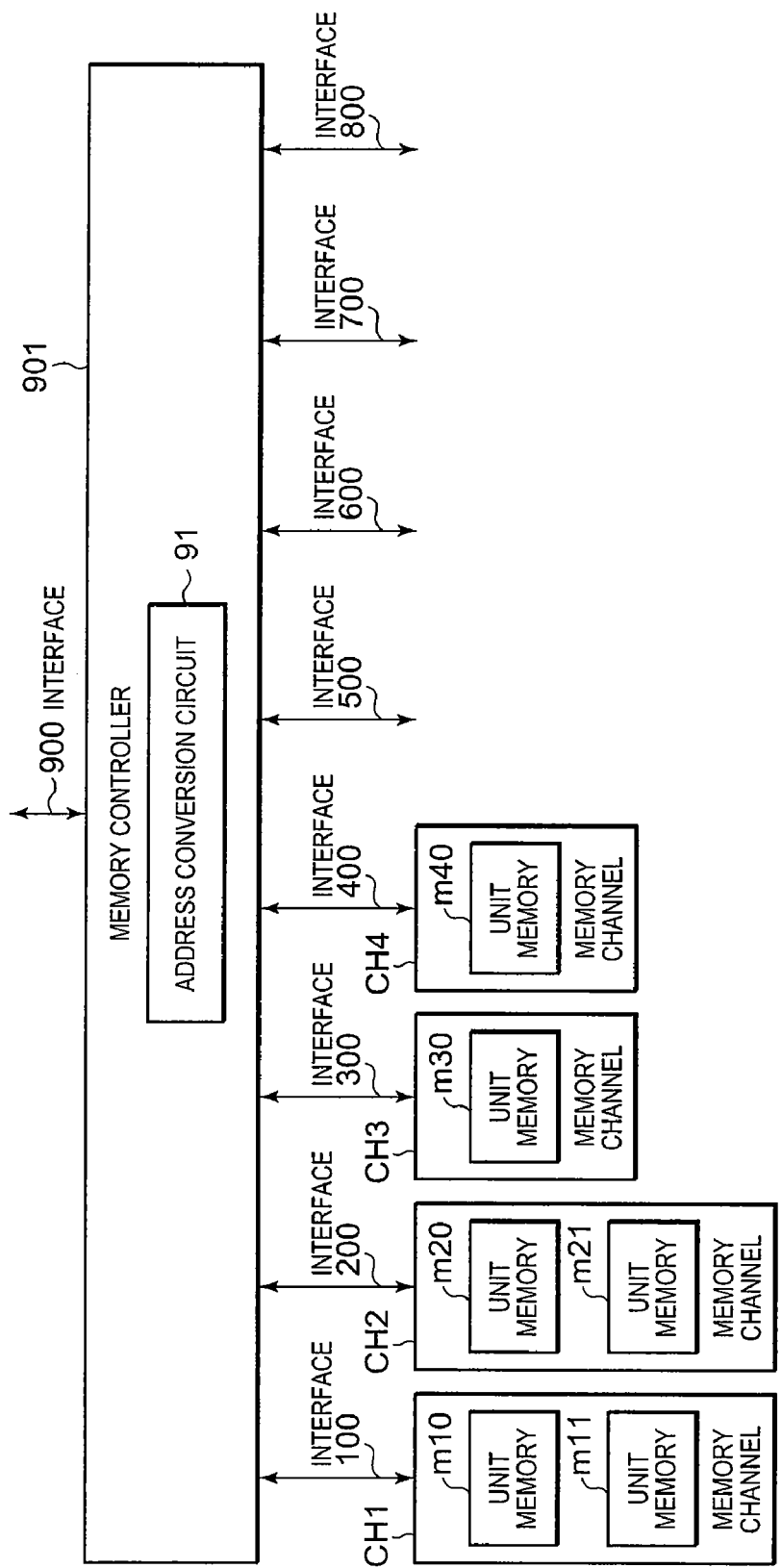
FIG. 10 is a block diagram showing the configuration of a second embodiment of the present invention.
Figure 11:
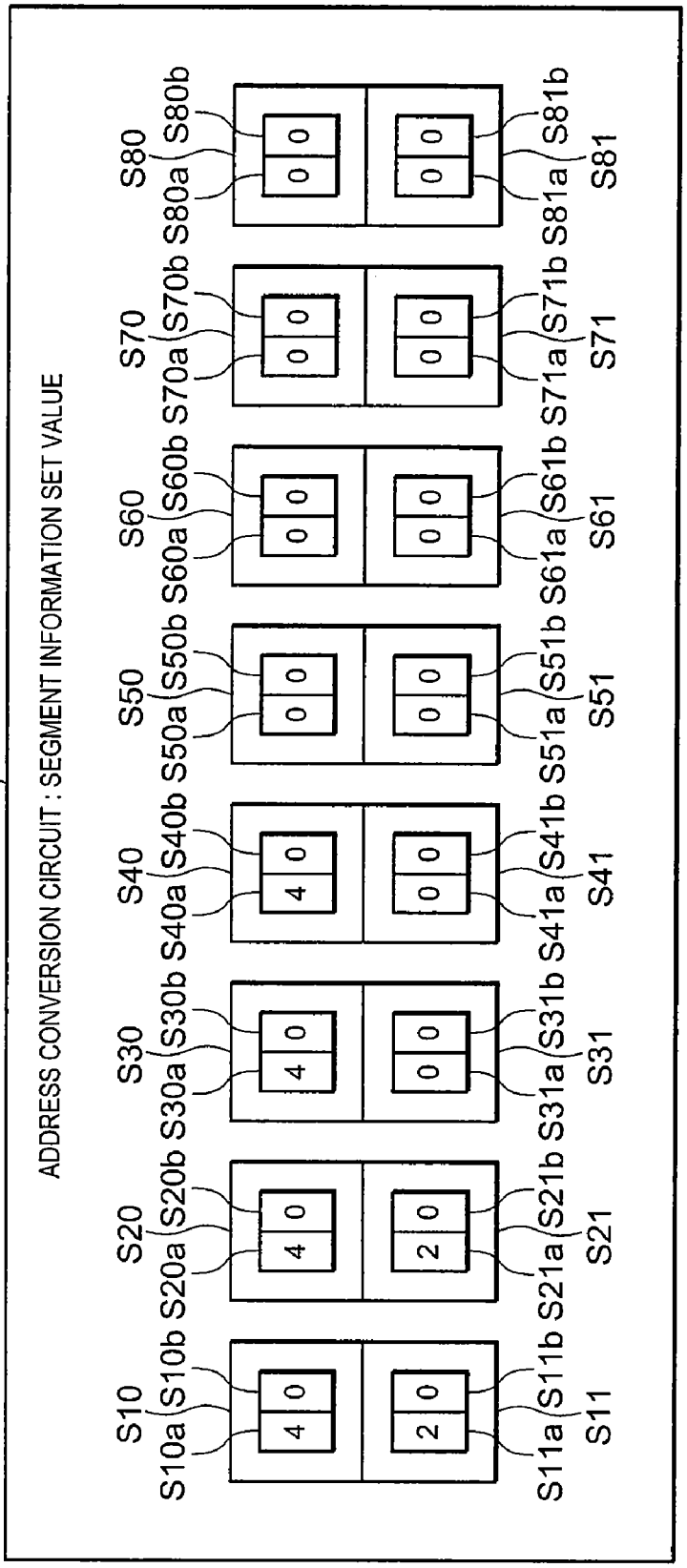
FIG. 11 is an explanatory view showing the operation of the second embodiment of the present invention.
Figure 12:
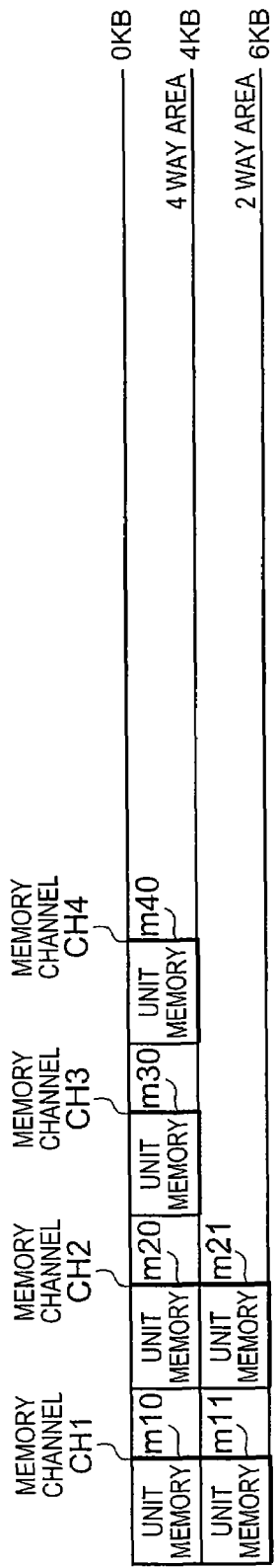
FIG. 12 is an explanatory view showing the operation of the second embodiment of the present invention.
Figure 13:
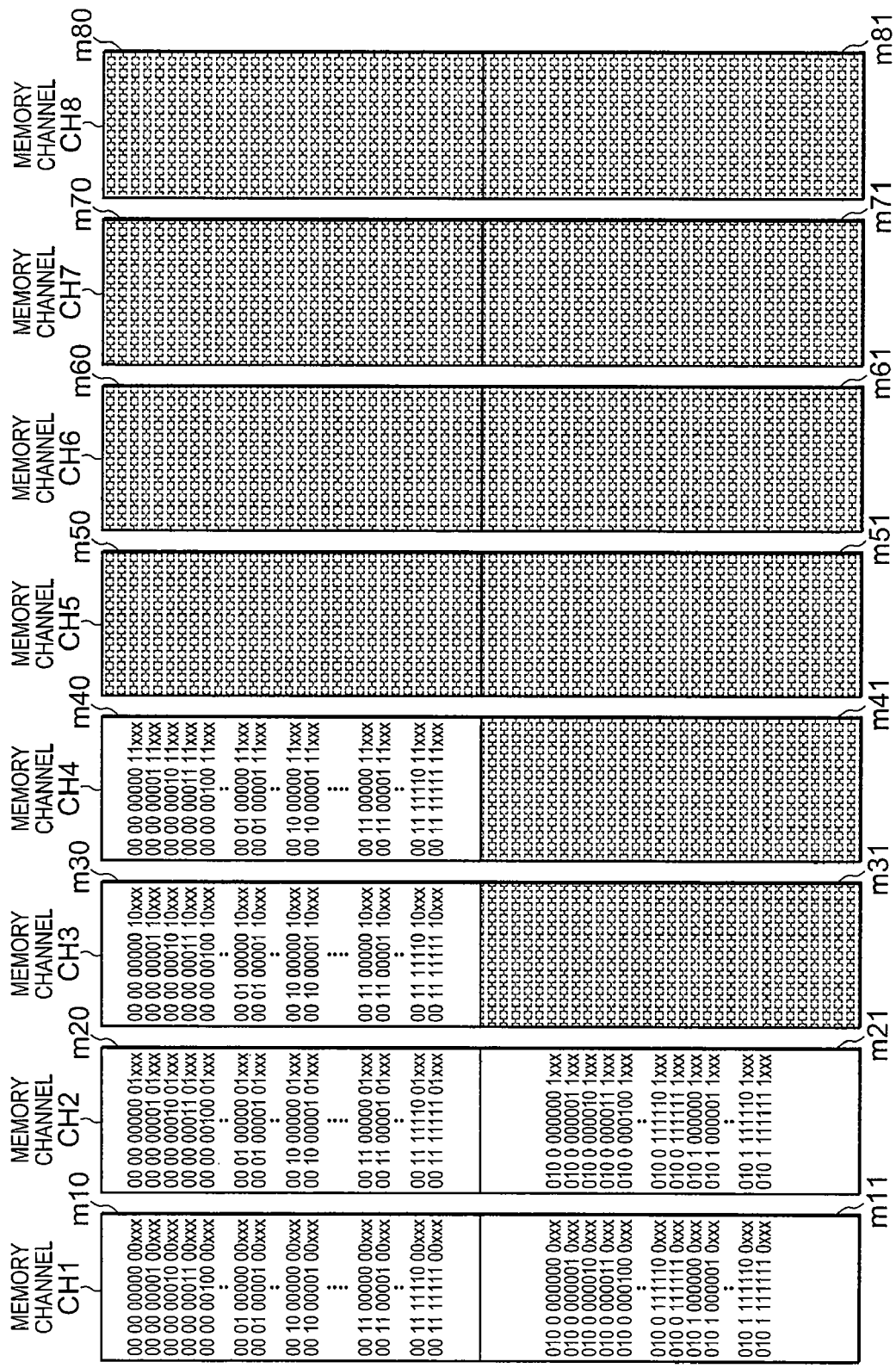
FIG. 13 is an explanatory view showing the operation of the second embodiment of the present invention.

FIG. 10 is a block diagram showing the configuration of the second embodiment of the present invention. FIGS. 11, 12, and 13 are explanatory views showing the operation according to the second embodiment of the present invention.

Figure 14:
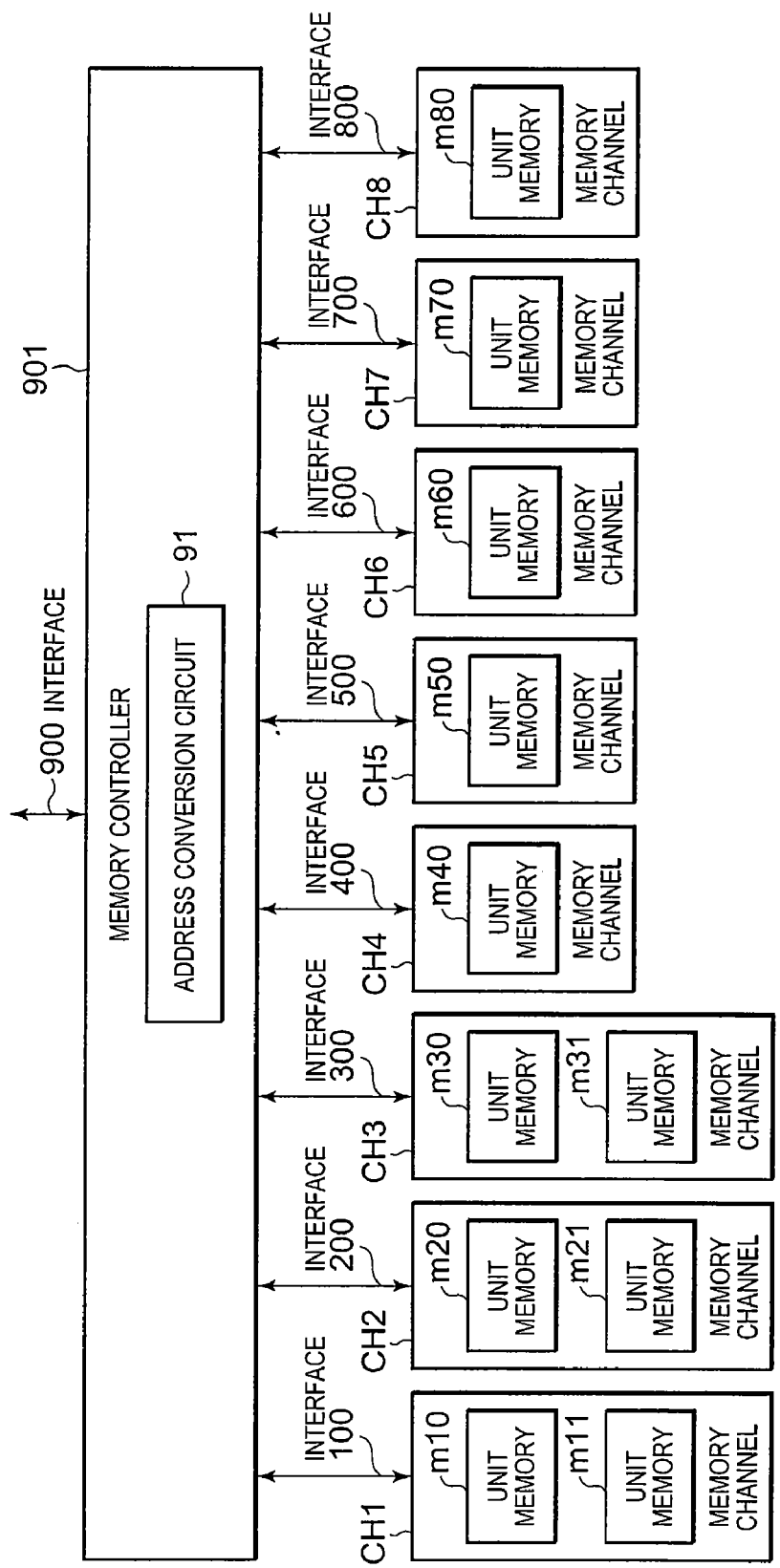
FIG. 14 is a block diagram showing the configuration of a third embodiment of the present invention.
Figure 15:
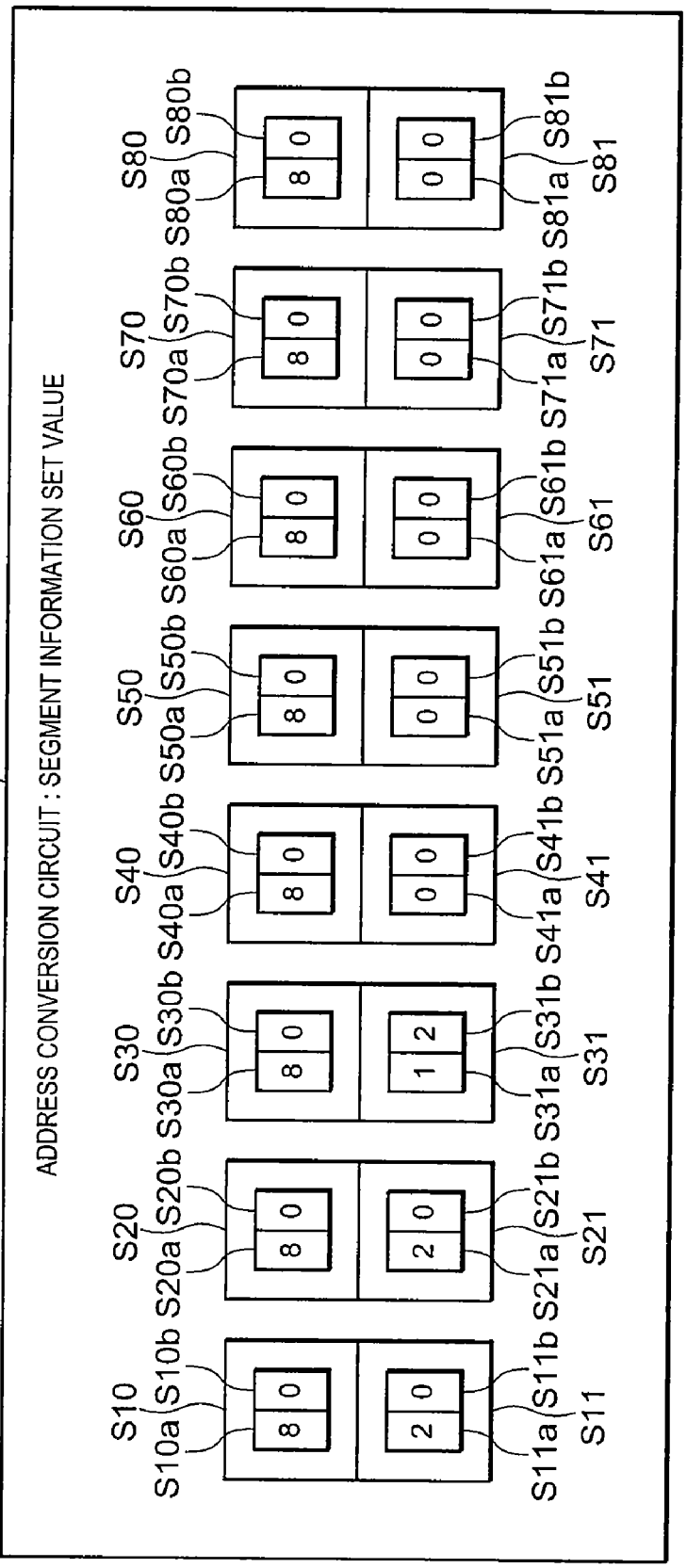
FIG. 15 is an explanatory view showing the operation of the third embodiment of the present invention.
Figure 16:
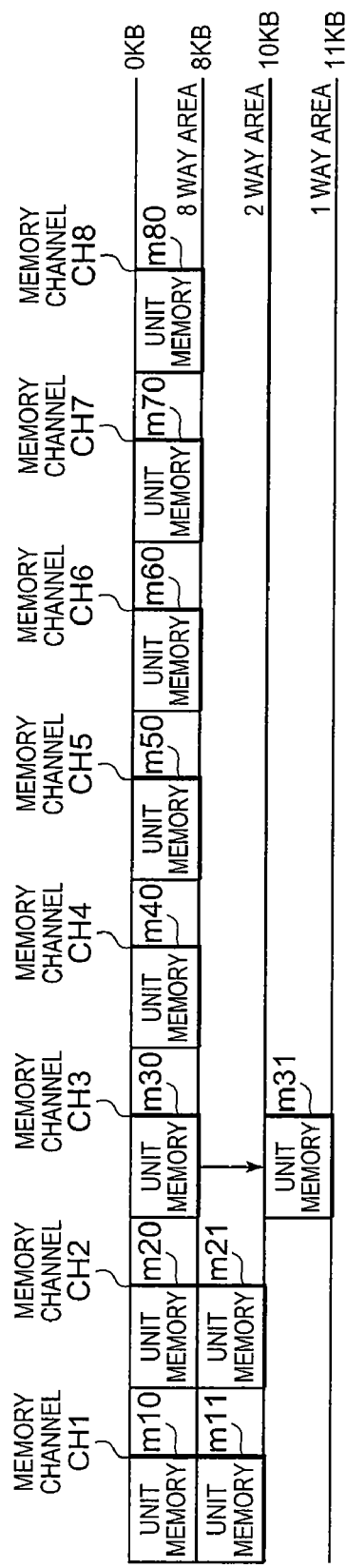
FIG. 16 is an explanatory view showing the operation of the third embodiment of the present invention.
Figure 17:
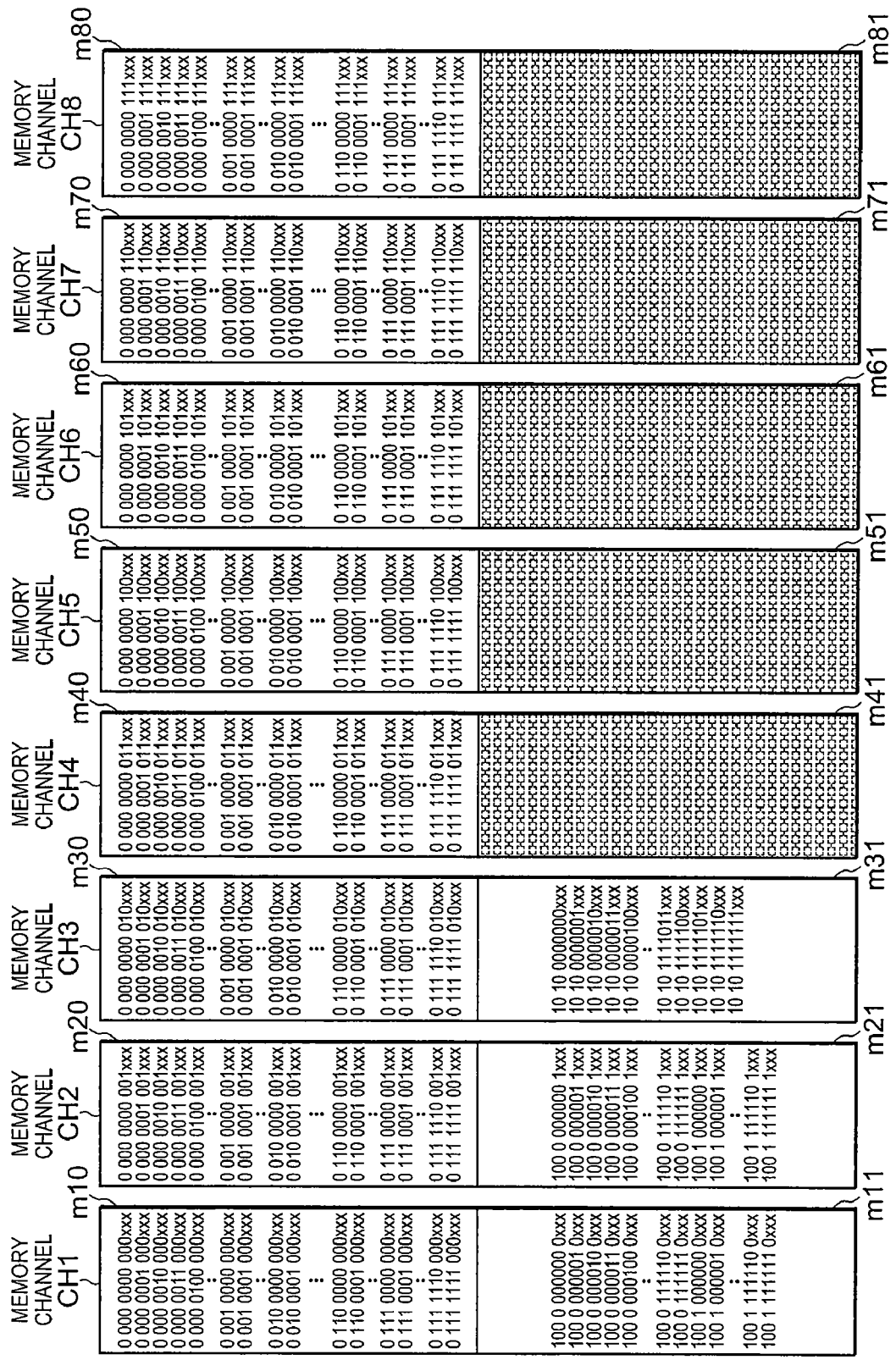
FIG. 17 is an explanatory view showing the operation of the third embodiment of the present invention.

FIG. 14 is a block diagram showing the configuration of the third embodiment of the present invention. FIGS. 15, 16, and 17 are explanatory views showing the operation according to the third embodiment of the present invention.

Figure 18:
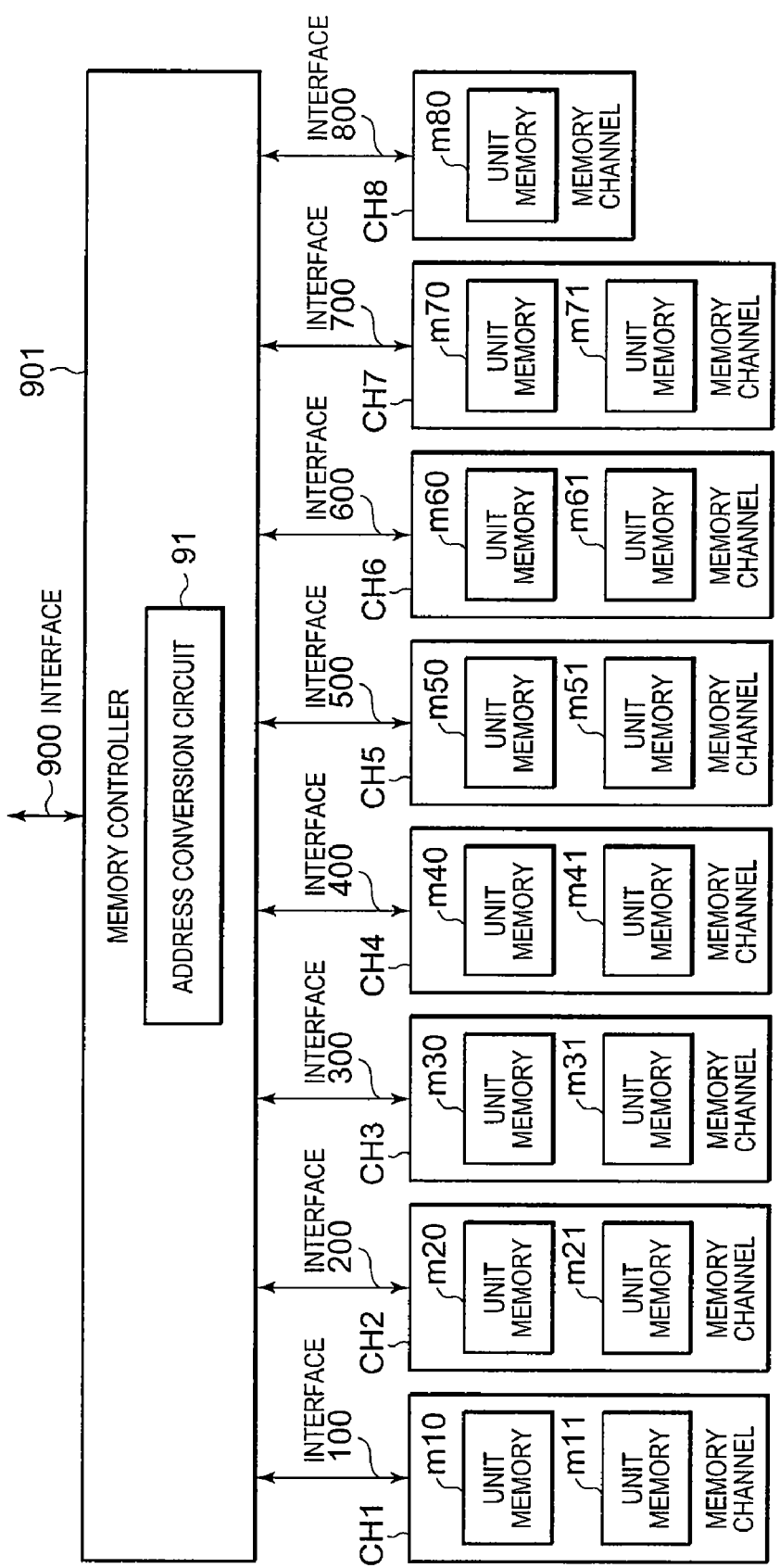
FIG. 18 is a block diagram showing the configuration of a fourth embodiment of the present invention.
Figure 19:
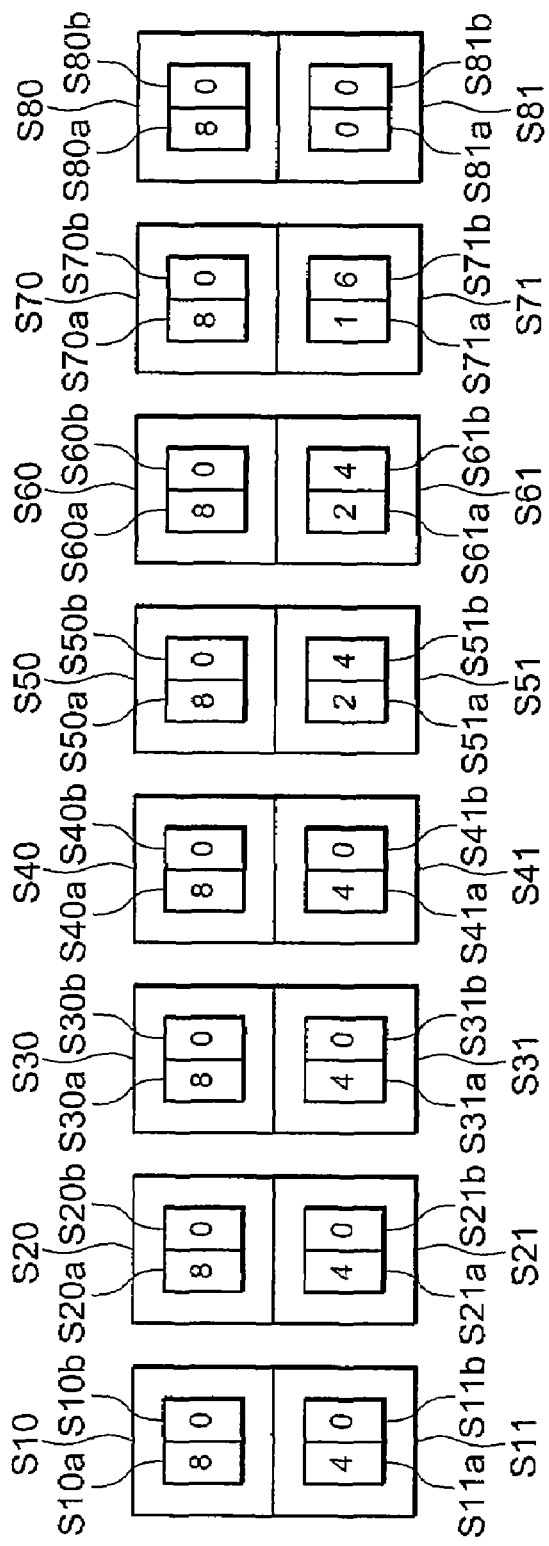
FIG. 19 is an explanatory view showing the operation of the fourth embodiment of the present invention.
Figure 20:
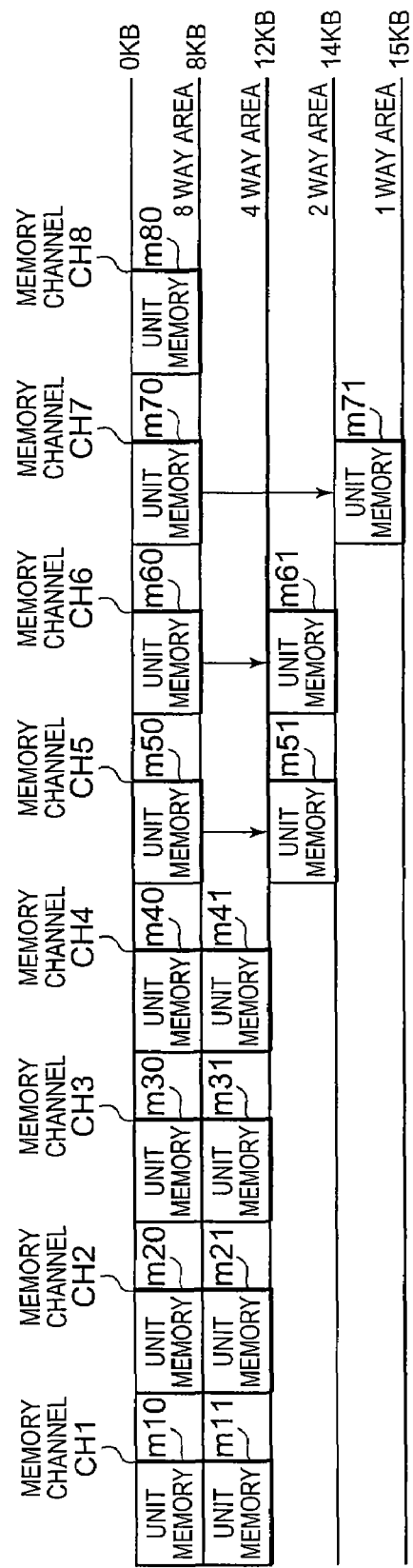
FIG. 20 is an explanatory view showing the operation of the fourth embodiment of the present invention.
Figure 21:
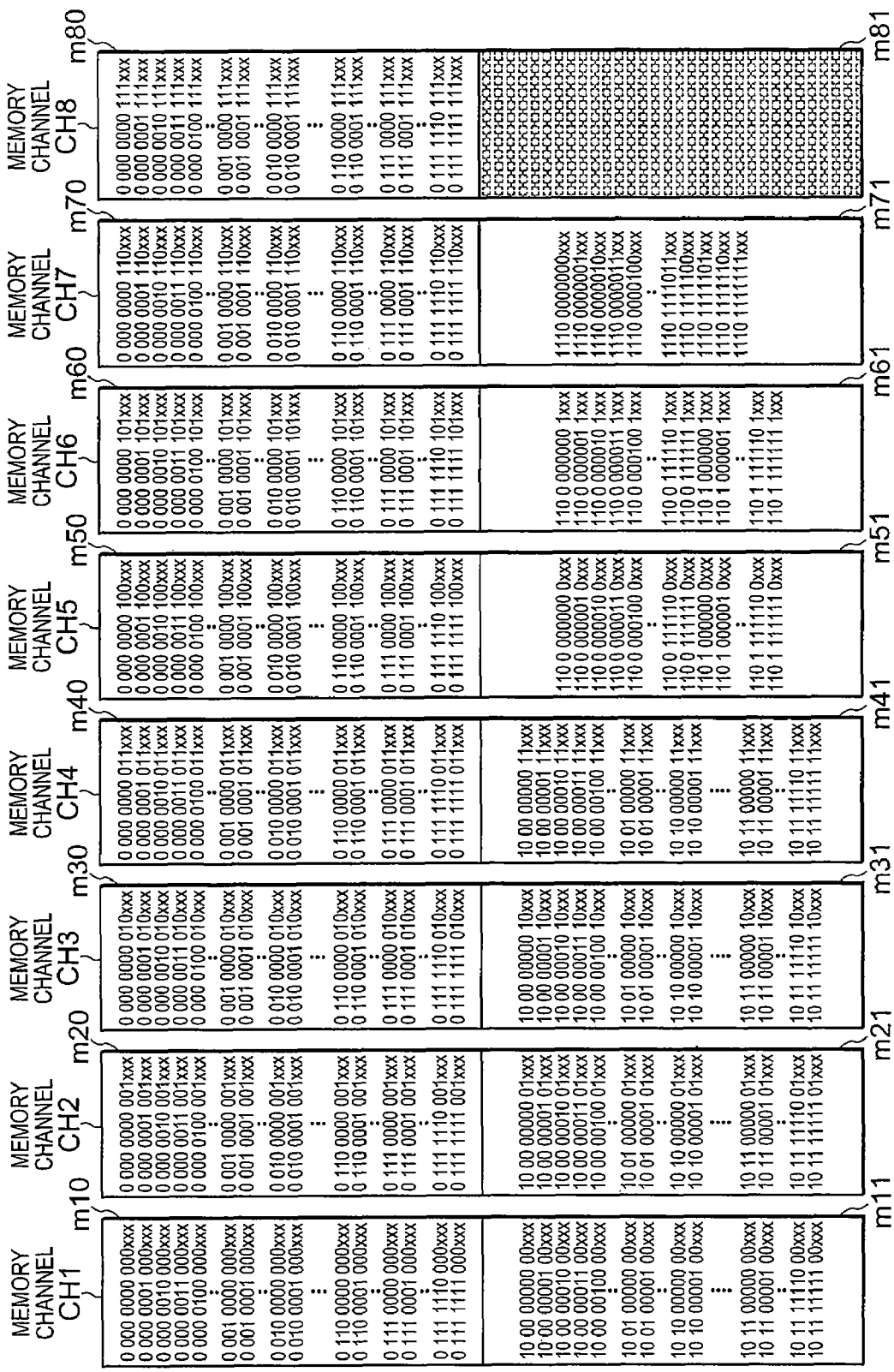
FIG. 21 is an explanatory view showing the operation of the fourth embodiment of the present invention.

FIG. 18 is a block diagram showing the configuration of the fourth embodiment of the present invention. FIGS. 19, 20, and 21 are explanatory views showing the operation of the fourth embodiment of the present invention.

In the first to fourth embodiments, only the difference is the number of implemented unit memories. Therefore, the first embodiment shown in FIG. 6 is explained here.

By referring to FIG. 6, the first embodiment of the present invention includes a memory controller 901, memory channels CH1 to CH8, unit memories m10 and m11 connected to the memory channel CH1, unit memories m20 and m21 connected to the memory channel CH2, unit memories m30 and m31 connected to the memory channel CH3, unit memories m40 and m41 connected to the memory channel CH4, unit memories m50 and m51 connected to the memory channel CH5, unit memories m60 and m61 connected to the memory channel CH6, unit memories m70 and m71 connected to the memory channel CH7, unit memories m80 and m81 connected to the memory channel CH8, and an address conversion circuit 91 built in the memory controller 901.

The memory controller 901 receives memory access through an interface 900, determines an unit memory to be accessed from among the unit memories m10, m11, m20, m21 to m80, and m81 from the address conversion result by the address conversion circuit 91, and issues access to the corresponding unit memory through the interfaces 100 to 800.

To simplify the explanation, it is assumed that the unit memories m10, m11, m20, m21 to m80, and m81 are an unit memory of the capacity of 1 KB of the configuration of 8-byte unit access×128 words. Therefore, the word address of unit memory is configured by 7 bits. The number of unit memories that can be connected to each of the memory channels CH1 to CH8 is two at maximum. Therefore, when the maximum configuration of the memory is as shown in FIG. 6, and the memory capacity is 1 KB×2×8=16 KB.

In the present embodiment, the minimum configuration of unit memory is 1 KB, and the 1 KB is a segment unit.

In FIG. 2, segment information holding circuits S10, S11, S20, S21 to S80, and S81 respectively correspond to the unit memories m10, m11, m20, m21 to m80, and m81 shown in FIG. 6. The segment information holding circuits S10, S11, S20, S21 to S80, and S81 respectively store the WAY numbers S10a, S11a, S20a, S21a to S80a, and S81a and the lower limit address increment segment numbers S10b, S11b, S20b, S21b to S80b, and S81b.

The segment information holding circuits S10, S11, S20, S21 to S80, and S81 shown in FIG. 2 store the set value at the maximum memory configuration according to the first embodiment shown in FIG. 6. Since 8-WAY control is performed in the unit memories m10, m20, m30 to m80, the WAY numbers S10a, S20a, and S30a to S80a store 8. Since 8-WAY control is performed in the unit memories m11, m21, m31 to m81, the WAY numbers S11a, S21, S31a to S81a store 8. Since there is no increment of the lower limit address, the lower limit address increment segment numbers S10b, S11b, S20b, S21b to S80b, and S81b all store 0.

Lower limit address holding circuits B10, B11, B20, B21 to B80, and B81 shown in FIG. 2 hold the lower limit addresses of the unit memories m10, m11, m20, m21 to m80, and m81 shown in FIG. 6 (they can hereinafter refer to also the value of a lower limit address). Upper limit address holding circuits T10, T11, T20, T21 to T80, and T81 hold the upper limit addresses of the unit memories m10, m11, m20, m21 to m80, and m81 (they can hereinafter refer to also the value of an upper limit address). Each of the lower limit addresses and the upper limit addresses is calculated and held from the information held in the segment information holding circuits S10, S11, S20, S21 to S80, and S81 at the initialization.

A base address B00 shows a base address of the memory space under the memory controller 901. Based on the base address B00, the lower limit addresses B10, B11, B20, B21 to B80, and B81 and the upper limit addresses T10, T11, T20, T21 to T80, and T81 of the unit memories m10, m11, m20, m21 to m80, and m81 are calculated.

In the present embodiment, the base address B00 is constantly 0 as shown in FIG. 4.

An access address C00 shown in FIG. 2 stores an access address issued by the memory controller 901 through the interface 900 shown in FIG. 6.

FIG. 3 shows the outline of the access address C00. In FIG. 3, according to the present embodiment, the maximum memory configuration capacity is 16 KB. Therefore, an address is 14 bits from A13 to A0. In addition, since the memory access unit is 8 bytes, the A13 to A3 other than A2 to A0 less than the 8-byte boundary address are referred to when an address is converted. Furthermore, since the minimum configuration capacity of each unit memory according to the present embodiment is 1 KB, the comparison of the lower limit addresses B10, B11, B20, B21 to B80, and B81 and the upper limit addresses T10, T11, T20, T21 to T80, and T81 of each unit memory shown in FIG. 2 with the access address C00 is performed using the upper four bits above the 1 KB boundary, that is, A13 to A10.

A method of calculating the lower limit addresses B10, B11, B20, B21 to B80, and B81 and the upper limit addresses T10, T11, T20, T21 to T80, and T81 respectively corresponding to the unit memories m10, m11, m20, m21 to m80, and m81 is explained below.

Relating to the memory channel CH1, the lower limit address B10 of the unit memory m10 is calculated based on the base address B00, and then the upper limit address T10 is calculated. Next, the lower limit address B11 of the unit memory m11 is calculated, and the upper limit address T11 is calculated.

The lower limit address B10 and the upper limit address T10 of the unit memory m10 of the memory channel CH1 are obtained by the following equations. The calculation is performed using only the upper four bits above the 1 KB boundary and the result is held.

lower limit address $B10$ of unit memory $m10$=base address $B00$+lower limit address increment segment number $S10b$ upper limit address $T10$ of unit memory $m10$=lower limit address $B10$ of unit memory $m10$+WAY number $S10a$ The lower limit address B11 and the upper limit address T11 of the unit memory m11 of the memory channel CH1 are obtained by the following equations. The calculation is performed using only the upper four bits above the 1 KB boundary.

lower limit address $B11$ of unit memory $m11$=upper limit address $T10$ of unit memory $m10$+upper limit address increment segment number $S11b$ upper limit address $T11$ of unit memory $m11$=lower limit address $B11$ of unit memory $m11$+WAY number $S11a$ The similar calculations are performed on the other memory channels CH2 to CH8.

Hit signals H10, H11, H20, H21 to H80, and H81 shown in FIG. 2 correspond to the unit memories m10, m11, m20, m21 to m80, and m81 shown in FIG. 6. For example, if the access address C00 is equal to or more than the lower limit address B10 of the unit memory m10 and less than the upper limit address T10, the hit signal H10 becomes valid. The hit signals H10 and H11 of the memory channel CH1, the hit signals H20 and H21 of the memory channel CH2, the hit signals H30 and H31 of the memory channel CH3, the hit signals H40 and H41 of the memory channel CH4, the hit signals H50 and H51 of the memory channel CH5, the hit signals H60 and H61 of the memory channel CH6, the hit signals H70 and H71 of the memory channel CH7, and the hit signals H80 and H81 of the memory channel CH8 are exclusively valid in the respective memory channels.

An access issue memory judgment circuit 93 shown in FIG. 2 selects the memory to be accessed from among the unit memories m10, m11, m20, m21 to m80, and m81 according to the hit signals H10, H11, H20, H21 to H80, and H81.

The access issue memory judgment circuit 93 recognizes an access address as a 1 WAY area when only one of the hit signals H10, H11, H20, H21 to H80, and H81 is valid, and issues access to the corresponding unit memory indicated by the hit signal. The access issue memory judgment circuit 93 recognizes an access address as a 2 WAY area as shown in FIG. 5 when two of the hit signals H10, H11, H20, H21 to H80, and H81 are valid, refers to the A3 of the access address C00, selects one of the two hit memory channels, and issues access to the corresponding unit memory. The access issue memory judgment circuit 93 recognizes an access address as a 4 WAY area as shown in FIG. 5 when four of the hit signals H10, H11, H20, H21 to H80, and H81 are valid, refers to the A4 to A3 of the access address C00, selects one of the four hit memory channels, and issues access to the corresponding unit memory. The access issue memory judgment circuit 93 recognizes an access address as an 8 WAY area as shown in FIG. 5 when eight of the hit signals H10, H11, H20, H21 to H80, and H81 are valid, refers to the A5 to A3 of the access address C00, selects one of the eight hit memory channels, and issues access to the corresponding unit memory.

Next, the operation according to the first embodiment of the present invention is explained below by referring to FIGS. 2, 6, 7, 8, and 9.

In the first embodiment, control is performed by conventional 8-WAY interleave (multiplier of 2).

FIG. 8 shows the outline of allocating an address to each unit memory in the first embodiment in which the unit memories m10, m11, m20, m21 to m80, and m81 are connected to the memory channels CH1 to CH8 under the memory controller 901 in FIG. 6.

In FIG. 8, in an address area equal to or more than 0 KB and less than 8 KB, the interleave control is performed by 8 WAYs of the unit memories m10, m20 to m80. In an address area equal to or more than 8 KB and less than 16 KB, the interleave control is performed by 8 WAYs of the unit memories m11, m21 to m81.

Based on the address allocation shown in FIG. 8, the WAY numbers $S10a$, $S11a$, $S20a$, $S21a$ to $S80a$, and $S81a$ of the segment information holding circuits S10, S11, S20, S21 to S80, and S81, and the lower limit address increment segment numbers $S10b$, $S11b$, $S20b$, $S21b$ to $S80b$ and $S81b$ are determined as shown in FIG. 7.

In FIG. 7, since the entire areas are interleaved by 8 WAYs in the first embodiment, 8 is set in the WAY numbers $S10a$, $S11a$, $S20a$, $S21a$ to $S80a$, and $S81a$. In addition, since the increment of the lower limit address has not been performed, 0 is set in the lower limit address increment segment numbers $S10b$, $S11b$, $S20b$, $S21b$ to $S80b$, and $S81b$.

FIG. 9 shows the detailed allocation of an address to each unit memory according to the first embodiment. Since the access unit to unit memory is 8 bytes, the lower three bits of an address is expressed by X (option).

The detailed operation of the address conversion circuit 91 in the first embodiment is explained by referring to FIG. 2.

The values of the lower limit addresses B10, B11, B20, B21 to B80, and B81 and the upper limit addresses T10, T11, T20, T21 to T80, and T81 are calculated as follows from set values shown in FIG. 7. The lower limit address B10 and the upper limit address T10 of the unit memory m10 of the memory channel CH1 are calculated by the following equations.

lower limit address $B10$ of unit memory $m10$=(base address $B00$) 0 KB+(lower limit address increment segment number $S10b$) 0 KB=0 KB upper limit address $T10$ of unit memory $m10$=(lower limit address $B10$ of unit memory $m10$) 0 KB+ (WAY number $S10a$) 8 KB=8 KB Therefore, the address area of the unit memory m10 is equal to or more than 0 KB and less than 8 KB. Similarly, the values of the lower limit addresses and the upper limit addresses of the unit memories m20, m30 to m80 are the same.

The lower limit address B11 and the upper limit address T11 of the unit memory m11 of the memory channel CH1 are calculated by the following equations.

lower limit address $B11$ of unit memory $m11$=(upper limit address $T10$ of unit memory $m10$)

8 KB+(upper limit address increment segment number $S11b$) 0 KB=8 KB upper limit address $T11$ of unit memory $m11$=(lower limit address $B11$ of unit memory $m11$) 8 KB+ (WAY number $S11a$) 8 KB=16 KB Thus, the address area of the unit memory m11 is equal to or more than 8 KB and less than 16 KB. Similarly, the values of the lower limit addresses and the upper limit addresses of the unit memories m21, m31 to m81 are the same.

In the first embodiment, when an address equal to or more than 0 KB and less than 8 KB is stored in the access address C00, eight signals of the hit signals H10, and H20 to H80 are valid from the set values of lower limit address and upper limit address. The access issue memory judgment circuit 93 recognizes the access address as an 8 WAY area, judges a memory channel of the access destination by A5 to A3 of the access address C00, and issues access to one of the unit memories m10, and m20 to m80. Similarly, when an address equal to or more than 8 KB and less than 16 KB is stored in the access address C00, eight signals of the hit signals H11, and H21 to H81 are valid from the set values of lower limit address and upper limit address. The access issue memory judgment circuit 93 recognizes the access address as an 8 WAY area, judges a memory channel of the access destination by A5 to A3 of the access address C00, and issues access to one of the unit memories m11, and m21 to m81.

Next, the second embodiment of the present invention is explained below by referring to FIGS. 10, 11, 12, and 13.

In the second embodiment, control is performed by both conventional 4 WAY and 2 WAY interleave (multiplier of 2).

In FIG. 10, the unit memories m10, m20, m30, m40, m11, and m21 are connected to the memory channels CH1 to CH4 under the memory controller 901. The memory channels CH5 to CH8 are unused. FIG. 12 shows the outline of the allocation of an address to each unit memory according to the second embodiment.

In FIG. 12, the interleave control is performed using 4 WAYs, that is, the unit memories m10, m20, m30, and m40, in an address area equal to or more than 0 KB and less than 4 KB. The interleave control is performed using 2 WAYs, that is, the unit memories m11 and M21, in an address area equal to or more than 4 KB and less than 6 KB.

Based on the allocation of the addresses shown in FIG. 12, the WAY numbers S10a, S11a, S20a, S21a to S80a, and S81a of the segment information holding circuits S10, S11, S20, S21 to S80, and S81 and the lower limit address increment segment numbers S10b, S11b, S20b, S21b to S80b, and S81b are determined as shown in FIG. 11.

In FIG. 11, in the second embodiment, 4 is set in the WAY numbers S10a, S20a, S301a, and S40a, 2 is set in the WAY numbers S11a and S21a, and 0 is set for an unused segment. Since the lower limit address has not been incremented, 0 is set in the lower limit address increment segment numbers S10b, S11b, S20b, S21b to S80b, and S81b.

FIG. 13 shows the detailed allocation of an address to each unit memory in the second embodiment. Since the access unit to the unit memory is 8 bytes, the lower 3 bits of an address is expressed by X (option).

The detailed operation of the address conversion circuit 91 in the second embodiment is explained by referring to FIG. 2.

The values of the lower limit addresses B10, B11, B20, B21 to B80, and B81 and the upper limit addresses T10, T11, T20, T21 to T80, and T81 are calculated as follows from the set value shown in FIG. 11.

The lower limit address B10 and the upper limit address T10 of the unit memory m10 of the memory channel CH1 are calculated by the following equations.

lower limit address $B10$ of unit memory $m10$=(base address $B00$) 0 KB+(lower limit address increment segment number $S10b$) 0 KB=0 KB upper limit address $T10$ of unit memory $m10$=(lower limit address $B10$ of unit memory $m10$) 0 KB+ (WAY number $S10a$) 4 KB=4 KB Therefore, the address area of the unit memory m10 is equal to or more than 0 KB and less than 4 KB. Similarly, the values of the lower limit addresses and the upper limit addresses of the unit memory m20, m30, and m40 are the same.

The lower limit address B11 and the upper limit address T11 of the unit memory m11 of the memory channel CH1 are calculated by the following equations.

lower limit address $B11$ of unit memory $m11$=(upper limit address $T10$ of unit memory $m10$)

4 KB+(lower limit address increment segment number $S11b$) 0 KB=4 KB upper limit address $T11$ of unit memory $m11$=(lower limit address $B11$ of unit memory $m11$) 4 KB+ (WAY number $S11a$) 2 KB=6 KB Thus, the address area of the unit memory m11 is equal to or more than 4 KB and less than 6 KB. Similarly, the values of the lower limit addresses and the upper limit addresses of the unit memory m21 are the same.

In the second embodiment, when the addresses equal to or more than 0 KB and less than 4 KB are stored in the access address C00, four signals of the hit signals H10, H20, H30, and H40 are valid from the set values of the lower limit addresses and the upper limit addresses. The access issue memory judgment circuit 93 recognizes the access address as an 4 WAY area, judges a memory channel of the access destination by A4 to A3 of the access address C00, and issues access to one of the unit memory m10, m20, m30, and m40. Similarly, when an address equal to or more than 4 KB and less than 6 KB is stored in the access address C00, two signals of hit signals H11 and H21 are valid from the set values of the lower limit address and the upper limit address. The access issue memory judgment circuit 93 recognizes the access address as an 2 WAY area, judges a memory channel of the access destination by A3 of the access address C00, and issues access to one of the unit memory m11 and m21.

Next, the third embodiment of the present invention is explained below by referring to FIGS. 2, 14, 15, 16, and 17.

Although control is conventionally performed by both 8 WAY and 3 WAY interleave, the address conversion circuit 91 in the third embodiment of the present invention replaces the 3 WAY area with a 2 WAY and 1 WAY area for control.

In FIG. 14, unit memory m10, m20, m30 to m80, m11, m21, and m31 are connected to the memory channels CH1 to CH8 under the memory controller 901.

FIG. 16 shows the outline of the allocation of an address to each unit memory in the third embodiment.

In FIG. 16, the interleave control is performed by the 8 WAYs of the unit memory m10, and m20 to m80 in the address area equal to 0 KB or more and less than 8 KB in the third embodiment as in the first embodiment. In the address area equal to or more than 8 KB and less than 11 KB, the interleave control is conventionally performed by the 3 WAYs of the unit memory m11, m21, and m31, but the interleave of a multiplier of 2 is realized in all address space by replacing the 3 WAYs with 2 WAYs and 1 WAY in the third embodiment of the present invention. Practically, in the address area equal to and more than 8 KB and less than 10 KB, the interleave control is performed by 2 WAYs of the unit memory m11 and m21, and the interleave control is performed by 1 WAY of the unit memory m31 in the address area equal to and more than 10 KB and less than 11 KB. The 3 WAYs are replaced with 2

WAYs and 1 WAY by realizing the increment of the lower limit address of the unit memory m31 by 2 KB (2 segments).

Based on the allocation of the address shown in FIG. 6, the WAY numbers S10a, S11a, S20a, S21a to S80a, and S81a of the segment information holding circuits S10, S11, S20, S21 to S80, and S81 shown in FIG. 2 and the lower limit address increment segment numbers S10b, S11b, S20b, S21b to S80b, and S81b are determined as shown in FIG. 15.

As shown in FIG. 15, in the third embodiment, 8 is set in the WAY numbers S10a, S20a, S301a, and S40a to S80a, 2 is set in the WAY numbers S11a and S21a, 1 is set in the WAY number S31a, and 0 is set in an unused segment. In addition, 2 is set in the lower limit address increment segment number S31b to perform a 2 KB (2 segments) increment on the lower limit address of the unit memory m31.

FIG. 17 shows the detailed allocation of an address to each unit memory in the third embodiment. Since the access unit to unit memory is 8 bytes, the lower 3 bits of the address are expressed by X.

The detailed operation of the address conversion circuit 91 in the third embodiment is explained by referring to FIG. 2.

The values of the lower limit addresses B10, B11, B20, B21 to B80, and B81, and the upper limit addresses T10, T11, T20, T21 to T80, and T81 shown in FIG. 2 are calculated as follows from the set values shown in FIG. 15. The lower limit address B10 and the upper limit address T10 of the unit memory m10 of the memory channel CH1 are calculated by the following equation.

lower limit address B10 of unit memory m10=(base address B00) 0 KB+(lower limit address increment segment number S10b) 0 KB=0 KB upper limit address T10 of unit memory m10=(lower limit address B10 of unit memory m10) 0 KB+ (WAY number S10a) 8 KB=8 KB Therefore, the address area of the unit memory m10 is equal to and more than 0 KB and less than 8 KB. Similarly, the values of the lower limit addresses and the upper limit addresses of the unit memory m20, m30 to m80 are the same.

The lower limit address B11 and the upper limit address T11 of the unit memory m11 of the memory channel CH1 are calculated by the following equations.

lower limit address B11 of unit memory m11=(upper limit address T10 of unit memory m10)

8 KB+(lower limit address increment segment number S11b) 0 KB=8 KB upper limit address T11 of unit memory m11=(lower limit address B11 of unit memory m11) 8 KB+ (WAY number S11a) 2 KB=10 KB Thus, the address area of the unit memory m11 is equal to or more than 8 KB and less than 10 KB. Similarly, the values of the lower limit addresses and the upper limit addresses of the unit memory m21 are the same.

The lower limit address B31 and the upper limit address T31 of the unit memory m31 of the memory channel CH3 to be incremented are calculated as follows.

lower limit address B31 of unit memory m31=(upper limit address T30 of unit memory m30)

8 KB+(lower limit address increment segment number S31b) 2 KB=10 KB upper limit address T31 of unit memory m31=(lower limit address B31 of unit memory m31) 10 KB+ (WAY number S31a) 1 KB=11 KB Therefore, the address area of the unit memory m31 is equal to and more than 10 KB and less than 11 KB.

In the third embodiment, when an address equal to and more than 0 KB and less than 8 KB is stored in the access address C00, it is the same as in the first embodiment, and the explanation is omitted here. When an address equal to and more than 8 KB and less than 10 KB is stored in the access address C00, the two signals, that is, the hit signals H11 and H21, are valid from the set values of the lower limit address and the upper limit address. The access issue memory judgment circuit 93 recognizes the access address as a 2 WAY area, judges a memory channel of an access issue destination by A3 of the access address COO, and issues an access to one of the unit memory m11 and m21. Similarly, when the access address C00 stores an address equal to and more than 10 KB and less than 11 KB, only the hit signal H31 is valid from the set values of the lower limit address and the upper limit address. The access issue memory judgment circuit 93 recognizes the access address as a 1 WAY area, and issues access to the unit memory m31.

Next, the fourth embodiment of the present invention is explained by referring to FIGS. 2, 18, 19, 20, and 21.

Although control is conventionally performed by both 8 WAY and 7 WAY interleave, the address conversion circuit 91 in the fourth embodiment of the present invention replaces the 7 WAY area with a 4 way area, a 2 WAY area, and a 1 WAY area for control.

In FIG. 18, unit memory m10, m20, m30 to m80, m11, and 21 to m71 are connected to the memory channels CH1 to CH8 under the memory controller 901. FIG. 20 shows the outline of the allocation of an address to each unit memory in the fourth embodiment.

In FIG. 20, the interleave control is performed by the 8 WAYs of the unit memory m10, and m20 to m80 in the address area equal to 0 KB or more and less than 8 KB in the fourth embodiment as in the first embodiment. In the address area equal to or more than 8 KB and less than 15 KB, the interleave control is conventionally performed by the 7 WAYs of the unit memory m11, and m21 to m71, but the interleave of a multiplier of 2 is realized in all address space by replacing the 7 WAYs with 4 WAYs, 2 WAYs, and 1 WAY in the fourth embodiment of the present invention.

Practically, in the address area equal to and more than 8 KB and less than 12 KB, the interleave control is performed by 4 WAYs of the unit memory m11, m21, m31, and m41 and the interleave control is performed by 2 WAYs of the unit memory m51 and m61 in the address area equal to and more than 12 KB and less than 14 KB. In the address area equal to and more than 14 KB and less than 15 KB, the interleave control is performed by 1 WAY of the unit memory m71. The 7 WAYs are replaced with 4 WAYs, 2 WAYs, and 1 WAY by realizing the increment of the lower limit address of the unit memory m51 and m61 by 4 KB (4 segments) and lower limit address of the unit memory m71 by 6 KB (6 segments).

Based on the allocation of an address shown in FIG. 20, the WAY numbers S10a, S11a, S20a, S21a to S80a, and S81a of the segment information holding circuits S10, S11, S20, S21 to S80, and S81, and the lower limit address increment segment numbers S10b, S11b, S20b, S21b to S80b, and S81b are determined as shown in FIG. 19.

In FIG. 19, in the fourth embodiment, 8 is set in the WAY numbers S10a, S20a, S301a, and S40a to S80a, 4 is set in the WAY numbers S11a, S21a, S31a, and S41a, 2 is set in the WAY numbers S51a and S61a, and 1 is set in the WAY number S71a. In the segments of the other unused unit memory, 0 is set. To increment the lower limit addresses of the unit memory m51 and m61 by 4 KB (4 segments), 4 is set in the lower limit address increment segment numbers S51b and S61b. In addition, to increment the lower limit address of the unit memory m71 by 6 KB (6 segments), 6 is set in the lower limit address increment segment number S71b.

FIG. 21 shows the detailed allocation of an address in each unit memory in the fourth embodiment. Since the access unit to unit memory is 8 bytes, the lower 3 bits of an address is expressed by X (option).

The detailed operation of the address conversion circuit 91 in the fourth embodiment is explained by referring to FIG. 2.

The values of the lower limit addresses B10, B11, B20, B21 to B80, and B81 and the upper limit addresses T10, T11, T20, T21 to T80, and T81 shown in FIG. 2 are calculated as follows from the set value shown in FIG. 19.

The lower limit address B10 and the upper limit address T10 of the unit memory m10 of the memory channel CH1 are calculated by the following equations.

lower limit address B10 of unit memory m10=(base address B00) 0 KB+(lower limit address increment segment number S10b) 0 KB=0 KB upper limit address T10 of unit memory m10=(lower limit address B10 of unit memory m10) 0 KB+ (WAY number S10a) 8 KB=8 KB Therefore, the address area of the unit memory m10 is equal to or more than 0 KB and less than 8 KB. Similarly, the values of the lower limit addresses and the upper limit addresses of the unit memory m20, and m30 to m80 are the same.

The lower limit address B11 and the upper limit address T11 of the unit memory m11 of the memory channel CH1 are calculated by the following equations.

lower limit address B11 of unit memory m11=(upper limit address T10 of unit memory m10)

8 KB+(lower limit address increment segment number S11b) 0 KB=8 KB

Upper limit address T11 of unit memory m11=(lower limit address B11 of unit memory m11) 8 KB+ (WAY number S11a) 4 KB=12 KB Thus, the address area of the unit memory m11 is equal to or more than 8 KB and less than 12 KB. Similarly, the values of the lower limit addresses and the upper limit addresses of the unit memory m21, m31, and m41 are the same.

The lower limit addresses B51 and B61 and the upper limit addresses T51 and T61 of the unit memory m51 and m61 of the memory channels CH5 and CH6 to be incremented are calculated by the following equations.

lower limit address B51 of unit memory m51=(upper limit address T50 of unit memory m50)

8 KB+(lower limit address increment segment number S51b) 4 KB=12 KB (The lower limit address increment segment number S51b) 4 KB is "total number of <<interleave determined in advance>>×unit memory capacity"=4×1 KB.

Upper limit address T51 of unit memory m51=(lower limit address B51 of unit memory m51) 12 KB+ (WAY number S51a) 2 KB=14 KB Therefore, the address area of the unit memory m11 is equal to and more than 12 KB and less than 14 KB. Similarly, the values of the lower limit addresses and the upper limit addresses of the unit memory m61 are the same.

Furthermore, The lower limit address B71 and the upper limit address T71 of the unit memory m71 of the memory channel CH7 to be incremented are calculated by the following equations.

Lower limit address B71 of unit memory m71=(upper limit address T70 of unit memory m70)

8 KB+(lower limit address increment segment number S71b) 6 KB=14 KB (The lower limit address increment segment number S71b) 6 KB is "total number of <<interleave determined in advance>>×unit memory capacity"=(4+2)×1 KB.

Upper limit address T71 of unit memory m71=(lower limit address B71 of unit memory m71) 14 KB+ (WAY number S71a) 1 KB=15 KB Therefore, the address area of the unit memory m71 is equal to and more than 14 KB and less than 15 KB.

In the fourth embodiment, when the access address C00 stores an address equal to and more than 0 KB and less than 8 KB, it is the same as in the first embodiment, and the explanation is omitted here. When the access address C00 stores an address equal to and more than 8 KB and less than 12 KB, the four signals of the hit signals H11, H21, H31, and H41 are valid from the set values of the lower limit addresses and the upper limit addresses. The access issue memory judgment circuit 93 recognizes a 4 WAY area, judges a memory channel of the access issue destination by the A4 to A3 of the access address C00, and issues access to one of the unit memory m11, m21, m31, and m41. Similarly, when the access address C00 stores an address equal to and more than 12 KB and less than 14 KB, the two signals of the hit signals H51 and H61 are valid from the set values of the lower limit addresses and the upper limit addresses. The access issue memory judgment circuit 93 recognizes a 2 WAY area, judges a memory channel of the access issue destination by the A3 of the access address C00, and issues access to one of the unit memory m51 and m61. Similarly, when the access address C00 stores an address equal to and more than 14 KB and less than 15 KB, only the hit signals H71 is valid from the set values of the lower limit address and the upper limit address. The access issue memory judgment circuit 93 recognizes a 1 WAY area, and issues access to the unit memory m71.

The above-mentioned control can be performed by firmware by providing control store.

What is claimed is:

1. An information processing apparatus comprising:
   a plurality of memory channels each including a unit memory;
   a circuit for performing interleave control such that an interleave number can be constantly a multiplier of 2 when the unit memory connected to a particular memory channel is accessed;
   a circuit for interleaving by a WAY number Z1 the unit memory of the way number Z1 as a maximum multiplier of 2 not exceeding a maximum WAY number X as a multiplier of 2 when a total number of the unit memory is Y, interleaving by a WAY number Z2 remaining unit memory of the WAY number Z2 as a maximum multiplier of 2 not exceeding the maximum WAY number X in remaining unit memories of Y−Z1, . . . , and interleaving, by a WAY number Zi, remaining unit memory of the WAY number Zi as a maximum multiplier of 2 not exceeding the maximum WAY number X;
   a segment information holding circuit for holding segment information as a pair of any of the WAY number Z1, Z2, . . . , and Zi, and a number of lower limit address increment segments as an increment from an address of the unit memory for which interleave is determined in advance in a same memory channel; and a lower limit address circuit for holding a lower limit address obtained by adding an upper limit address of the unit memory for which interleave is determined in advance in the same memory channel to the number of the lower limit address increment segments of the unit memory of the segment information; an upper limit address circuit for holding an upper limit address obtained by adding the lower limit address of the unit memory to a WAY number of the unit memory of the segment information; and an address conversion circuit for outputting a hit signal when the lower limit address$\leqq$an access address<the upper limit address holds true, and performing interleave of a WAY number of a number of hit signals on the access address.

2. The information processing apparatus according to claim 1, further comprising:

a data processing device having the segment information holding circuit and outputting an access address; and a memory controller for inputting an access address and including the lower limit address circuit, the upper limit address circuit, and the address conversion circuit.

3. The information processing apparatus according to claim 2, further comprising:

a memory device connected to the memory controller and provided with the unit memory.

4. The information processing apparatus according to claim 1, comprising:

a data processing device for outputting an access address; and a memory controller having the lower limit address circuit, the upper limit address circuit, and the address conversion circuit.

5. The information processing apparatus according to claim 4, further comprising:

a memory device connected to the memory controller and provided with the unit memory.

6. An information processing method comprising:

performing interleave control on unit memories connected to a plurality of memory channels such that an interleave number can be constantly a multiplier of 2 when the unit memories connected to the memory channels is accessed;

interleaving by a WAY number Z1 the unit memory of a WAY number Z1 as a maximum multiplier of 2 not exceeding a maximum WAY number X as a multiplier of 2 when a total number of the unit memory is Y;

interleaving by a WAY number Z2 the unit memory of a WAY number Z2 as a maximum multiplier of 2 not exceeding the maximum WAY number X in unit memory of Y−Z1; and interleaving, by a WAY number Zi, remaining unit memory of a WAY number Zi as a maximum multiplier of 2 not exceeding the maximum WAY number X;

holding segment information as a pair of any of the WAY number Z1, Z2, . . . , and Zi, and a number of lower limit address increment segments as an increment from an address of the unit memory for which interleave is determined in advance in the same memory channel;

holding a lower limit address obtained by adding an upper limit address of the unit memory for which interleave is determined in advance in the same memory channel to the number of the lower limit address increment segments of the unit memory of the segment information;

holding an upper limit address obtained by adding the lower limit address of the unit memory to a WAY number of the unit memory of the segment information;

outputting a hit signal when the lower limit address$\leqq$an access address<the upper limit address holds true; and performing interleave of a WAY number of a number of hit signals on the access address.

7. A computer readable medium storing a program that when executed by a computer having an information processing apparatus causes the information processing apparatus to perform a process comprising:

performing interleave control on unit memories connected to a plurality of memory channels such that an interleave number can be constantly a multiplier of 2 when the unit memories connected to the memory channels is accessed;

interleaving by a WAY number Z1 the unit memory of a WAY number Z1 as a maximum multiplier of 2 not exceeding a maximum WAY number X as a multiplier of 2 when a total number of the unit memory is Y;

interleaving by a WAY number Z2 the unit memory of a WAY number Z2 as a maximum multiplier of 2 not exceeding the maximum WAY number X in unit memory of Y−Z1; and interleaving, by a WAY number Z1, remaining unit memory of a WAY number Z1 as a maximum multiplier of 2 not exceeding the maximum WAY number X;

holding segment information as a pair of any of the WAY number Z1, Z2, . . . , and Zi, and a number of lower limit address increment segments as an increment from an address of the unit memory for which interleave is determined in advance in the same memory channel;

holding a lower limit address obtained by adding an upper limit address of the unit memory for which interleave is determined in advance in the same memory channel to the number of the lower limit address increment segments of the unit memory of the segment information;

holding an upper limit address obtained by adding the lower limit address of the unit memory to a WAY number of the unit memory of the segment information;

outputting a hit signal when the lower limit address$\leqq$an access address<the upper limit address holds true; and performing interleave of a WAY number of a number of hit signals on the access address.

\* \* \* \* \*